United States Patent
Xu et al.

(10) Patent No.: US 10,763,769 B2
(45) Date of Patent: Sep. 1, 2020

(54) CONTROLLER FOR POWER CONVERTOR AND MOTOR DRIVING SYSTEM

(71) Applicants: Wisconsin Alumni Research Foundation, Madison, WI (US); Toshiba Mitsubishi-Electric Industrial Systems Corporation, Tokyo (JP)

(72) Inventors: Yang Xu, Madison, WI (US); Chikara Morito, Tokyo (JP); Robert D. Lorenz, Madison, WI (US)

(73) Assignees: Wisconsin Alumni Research Foundation, Madison, WI (US); Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 16/022,779

(22) Filed: Jun. 29, 2018

(65) Prior Publication Data

US 2020/0007058 A1 Jan. 2, 2020

(51) Int. Cl.
*H02P 21/00* (2016.01)
*H02P 21/14* (2016.01)
*H02P 21/18* (2016.01)
*H02P 21/20* (2016.01)
*H02P 27/12* (2006.01)

(52) U.S. Cl.
CPC ........ *H02P 21/0089* (2013.01); *H02P 21/141* (2013.01); *H02P 21/18* (2016.02); *H02P 21/20* (2016.02); *H02P 27/12* (2013.01)

(58) Field of Classification Search
CPC .................................................. H02P 21/0089
See application file for complete search history.

(56) References Cited

U.S. PATENT DOCUMENTS 9,281,772 B2 3/2016 Wang et al.
2001/0043048 A1 11/2001 Tajima et al.
(Continued)

FOREIGN PATENT DOCUMENTS

JP 2016-010311 A 1/2016

OTHER PUBLICATIONS

Xu et al., "Extending Low Speed Self-Sensing via Flux Tracking with Volt-Second Sensing," IEEE Energy Conversion Congress and Exposition (2017), pp. 1888-1895.
(Continued)

*Primary Examiner* — Kawing Chan
*Assistant Examiner* — Bradley R Brown
(74) *Attorney, Agent, or Firm* — Finnegan, Henderson, Farabow, Garrett & Dunner, L.L.P.

(57) ABSTRACT

A controller for a power convertor includes: a torque command value calculation module to calculate a first torque command value to a power convertor; a torque command limit module to receive the first torque command value and generate a second torque command value obtained by correcting the first torque command value so that the first torque command value is limited to a torque limiter range. The torque command limit module sets a width between the upper limit torque value and the lower limit torque value of the torque limiter range to be smaller as a fundamental wave output frequency of the power convertor increases at least in a speed region equal to or higher than a field weakening starting point.

13 Claims, 15 Drawing Sheets

(56) References Cited

U.S. PATENT DOCUMENTS

| | | | |
|---|---|---|---|
| 2009/0284195 A1* | 11/2009 | Gallegos-Lopez | ... B60L 15/025 318/400.02 |
| 2013/0175955 A1* | 7/2013 | Son | H02P 21/13 318/400.02 |
| 2015/0333683 A1* | 11/2015 | Usuda | H02P 21/05 318/812 |
| 2015/0381092 A1* | 12/2015 | Wang | H02P 3/18 318/400.02 |
| 2019/0006971 A1 | 1/2019 | Xu et al. | |

OTHER PUBLICATIONS

Kim et al., "Maximum Torque Control of an Induction Machine in the Field Weakening Region," IEEE Transactions on Industrial Applications (Jul./Aug. 1995), 31:787-794.

Mengoni et al., "Stator Flux Vector Control of Induction Motor Drive in the Field Weakening Region," IEEE Transactions on Power Electronics (Mar. 2008), 23:941-949.

Lorenz, "The Emerging Role of Dead-beat, Direct Torque and flux Control in the Future of Induction Machine Drives." 11$^{th}$ International Conference on Optimization of Electrical and Electronic Equipment (2008), pp. 1927.

Zarri et al., "Control Schemes for Field Weakening of Induction Machines: a Review," IEEE Workshop on Electrical Machines Design, Control and Diagnosis (2015), pp. 146-155.

Krishnan, "Review of Flux-Weakening in High Performance Vector Controlled Induction Motor Drives," Proceedings of IEEE International Symposium on Industrial Electronics (Jun. 1996), pp. 917-922.

Joetten et al., "Control of the Induction Machine in the Field Weakening Range," Proceedings of International Federal of Automatic Control (Sep. 1983), pp. 297-304.

Xu et al., "Selection of the Flux Reference for Induction Machine Drives in the Field Weakening Region," IEEE Transactions on Industry Applications (Nov./Dec. 1992), 28:1353-58.

Wang et al., "A comparative Overview of Indirect Field Oriented Control (IFOC) and Deadbeat-Direct Torque and Flux Control (DS-DTFC) for AC Motor Drives," Chinese Journal of Electrical Engineering (Dec. 2015), 1:9-20.

Obermann et al., "Deadbeat-Direct Torque & Flux Control Motor Drive over a Wide Speed, Torque and Flux Operating Space using a Single Control Law," IEEE Energy Conversion Congress and Exposition (Sep. 2010), pp. 215-222.

Seok et al., "Optimal Flux Selection of an Induction Machine for Maximum Torque Operation in Flux-Weakening Region," IEEE Transactions on Power Electronics (Jul. 1999), 14:700-708.

* cited by examiner

Noise in Estimated Speed Using Rotor Flux Tracking

CONTROLLER FOR POWER CONVERTOR AND MOTOR DRIVING SYSTEM

FIELD

The present application relates to a controller for a variable voltage and variable frequency type power convertor and a motor driving system.

BACKGROUND

U.S. Pat. No. 9,281,772 discloses a controller for a power convertor. The controller can put, on a motor, a brake of good response. The following Non Patent Literature 1 discloses a flux observer for safe operation of a motor.

Patent Literature 1: U.S. Pat. No. 9,281,772

Non Patent Literature 1: Y. Xu, Y. Wang, R. Iida and R. D. Lorenz, "Extending low speed self-sensing via flux tracking with volt-second sensing," 2017 IEEE Energy Conversion Congress and Exposition, Cincinnati, Ohio, 2017, pp. 1888-1895.

SUMMARY

However, in the systems of the above Patent Literature 1 and Non-Patent Literature 1, no field weakening is implemented. For this reason, an operation of the electric motor can be limited on the high speed range.

As a general technique of field weakening, there is a method of suppressing the influence of voltage saturation when the output frequency of the power converter increases, by lowering the flux command value in inverse proportion to the rotational speed. The fundamental output frequency of the power converter is also referred to as power supply angular frequency.

The flux command method in simply inverse proportion to a frequency does not consider the output limit of the convertor. Therefore, the control stability is potentially degraded when output torque in a field weakening region is increased.

The present application is intended to solve the above-described problem and provide a controller for a power convertor, and a motor driving system that are capable of simultaneously achieving control stability and output torque increase in a field weakening region.

In the control device described in Non-Patent Literature 1, sensorless control is performed by obtaining the rotation speed using the stator flux estimated by the flux observer. However, this stator flux is subject to harmonics caused by PWM control and current measurement noise. For this reason, the stator flux has a low S/N ratio because the flux amplitude decreases particularly in the field weakening region. For these reasons, the accuracy of the speed estimation declines and there is a possibility that stable operation cannot be performed.

The present application is also intended to provide a controller for a power convertor, and a motor driving system that are capable of highly accurately calculating an estimated speed value.

A first controller for a power convertor according to a first aspect of the present application includes: a torque command value calculation module configured to calculate a first torque command value to a power convertor based on a speed command value of a motor driven by the power convertor; a torque command limit module configured to receive the first torque command value and generate a second torque command value obtained by correcting the first torque command value so that the first torque command value is limited to a torque limiter range defined by an upper limit torque value calculated by a predetermined calculation formula for upper limit torque command value calculation and a lower limit torque value obtained by multiplying the upper limit torque value by a predetermined negative coefficient or zero; a flux command generation module configured to generate a stator flux command value in accordance with a fundamental wave output frequency of output from the power convertor; and an output voltage calculation module configured to calculate an output voltage command value of the power convertor based on the second torque command value and the stator flux command value. The torque command limit module calculates the upper limit torque value to be smaller as the fundamental wave output frequency increases at least in a speed region equal to or higher than a field weakening starting point.

A second controller for a power convertor according to a second aspect of the present application includes: a torque command value calculation module configured to calculate a torque command value to a power convertor based on a speed command value of a motor driven by the power convertor; a voltage command value calculation module configured to calculate a voltage command value to the power convertor based on the torque command value calculated by the torque command value calculation module; a flux estimation module configured to calculate estimated values of the stator flux and rotor flux of the motor in a subsequent control period based on the voltage command value to the power convertor and a measured stator current of the motor; and a motor speed estimation module configured to calculate an estimated value of a speed of the motor in a subsequent control period based on the estimated value of the rotor flux calculated by the flux estimation module.

A motor driving system according to a third aspect of the present application includes: a power convertor configured to drive a motor; and one of the first or second controller for a power convertor, which is configured to control the power convertor.

Other and further objects, features and advantages of the invention will appear more fully from the following description.

DESCRIPTION OF EMBODIMENTS

Figure 1:
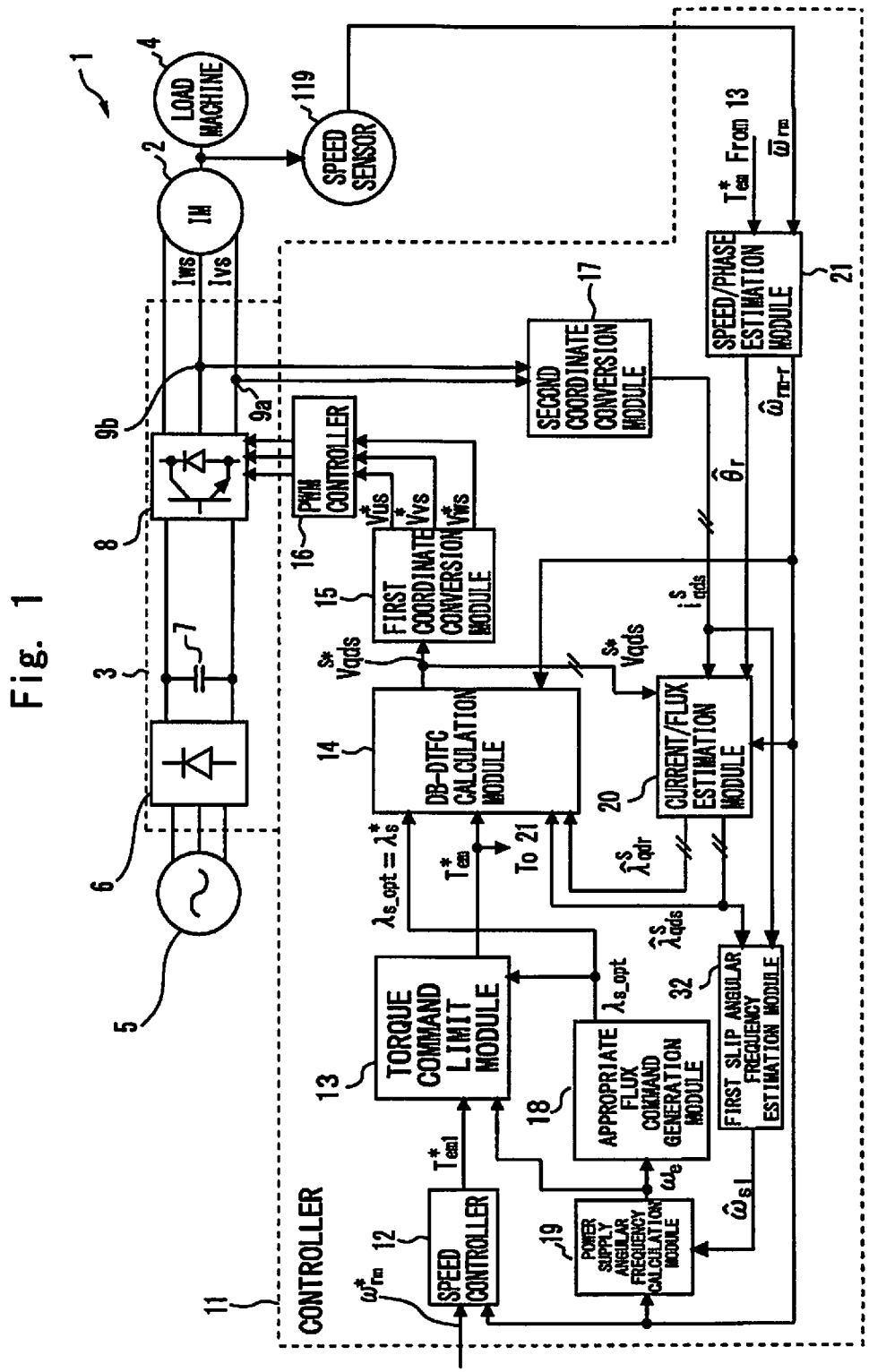
FIG. 1 is a configuration diagram of a motor system to which a controller for a power convertor according to a first embodiment is applied.

Embodiments of the present invention will be described in accordance with the accompanying drawings. It should be noted that in the drawings, the same or corresponding parts are denoted by the same reference signs. Overlapping description of such parts will be simplified or omitted as appropriate.

Symbols are explained below. Complex vectors are as follows.

$V_{qds}$ stator voltage complex vector [V]
$V_{qdr}$ rotor voltage complex vector [V]
$i_{qds}$ stator current complex vector [A]
$i_{qdr}$ rotor current complex vector) [A]
$\lambda_{qds}$ stator flux linkage complex vector [V-sec]
$\lambda_{qdr}$ rotor flux linkage complex vector [V-sec]
Scalars are as follows.
$V_{qs}$ stator q-axis voltage [V]
$V_{ds}$ stator d-axis voltage [V]
$V_{qr}$ rotor q-axis voltage [V]
$V_{dr}$ rotor d-axis voltage [V]
$i_{qs}$ stator q-axis current [A]
$i_{ds}$ stator d-axis current [A]
$i_{qr}$ rotor q-axis current [A]
$i_{dr}$ rotor d-axis current [A]
$\lambda_{qs}$ stator q-axis Flux [V-sec]
$\lambda_{ds}$ stator d-axis Flux [V-sec]
$\lambda_{qr}$ rotor q-axis Flux [V-sec]
$\lambda_{dr}$ rotor d-axis Flux [V-sec]
$T_e$ electromagnetic torque [N-m]
$T_L$ load torque [N-m]
$v_{us}$ u-phase stator voltage [V]
$v_{vs}$ v-phase stator voltage [V]
$v_{ws}$ w-phase stator voltage [V]
$i_{us}$ u-phase stator current [A]
$i_{vs}$ v-phase stator current [A]
$i_{ws}$ w-phase stator current [A]
$i_{ur}$ u-phase rotor current [A]
$i_{vr}$ v-phase rotor current [A]
$i_{wr}$ w-phase rotor current [A]
$R_s$ stator resistance [Ω]
$R_r$ rotor resistance [Ω]
$L_{ls}$ stator leakage inductance [H]
$L_{lr}$ rotor leakage inductance [H]
$L_m$ magnetizing inductance [H]
$L_s$ stator winding inductance [H] $L_s=L_{ls}+L_m$
$L_r$ rotor winding inductance [H] $L_r=L_{lr}+L_m$ $\sigma$ leakage factor $\quad \sigma := 1 - (L_m^2/L_s L_r)$ $J_p$ inertia [kg-m²]
P Pole number
P/2 Pole pair number
$t_s$ sampling time [s]
$P_{cu}$ IM cupper loss [W]
$P_{fe}$ IM iron loss [W]
$P_{loss}$ IM loss [W] $P_{loss}=P_{cu}+P_{fe}$
$P_e$ input power [W] $P_e=P_{loss}+P_{stored}+P_{em}$
$P_{stored}$ Time differentiation of magnetic energy accumulated in the inductance of the induction machine [W]
$P_{em}$ mechanical loss [W] (Power contributing to torque)
$K_e$ eddy current coefficient
$K_h$ hysteresis coefficient
$R_{eq}$ equivalent resistance [Ω]
$\tau_{eq}$ equivalent time constant [s]
$\tau_r$ rotor time constant [s] That is, MI_T2 (Secondary time constant)
ω angular speed [rad/s] ω=pθ
General Description without Specifying Coordinate System (Arbitrary Coordinate System)
θ angle [rad] ω=pθ General description without specifying the coordinate system
$ω_r$ rotor electrical angular speed [rad/s] $ω_r=Pω_{rm}/2$
$θ_r$ rotor electrical angular position [rad]
(Angle of u-Phase Rotor Winding Taken Counterclockwise with Respect to u-Phase Stator Winding)
$ω_{rm}$ rotor mechanical angular speed [rad/s] $ω_{rm}=2ω_r/P$
Rotational Angular Speed of the Output Shaft
$θ_{rm}$ rotor mechanical angle [rad] $θ_{rm}=2θ_r/P$
Rotational Angular of the Output Shaft
$ω_e$ synchronous angular frequency [rad/s]
ω=pθ, but if the synchronization angular frequency is constant, it is also expressed as ωt=θ.
$θ_e$ synchronous angular position
$ω_{sl}$ slip angular frequency [rad/s]
$ω_{sl}=ω_e-ω_r$
Mathematical Elements are as Follows.
j imaginary number
p differential operator
s Laplace operator
a space vector rotation operator $\underline{a}=\exp(j2π/3)$
Re{ } complex real part
Im{ } complex imaginary part
L{ } Laplace transform
Z{ } z-transform)
Each symbol of superscript has the following meaning.
f$^s$ stationary reference frame
f$^e$ general synchronous reference frame f' rotor reference frame
f^(ras) re-aligned stationary reference frame
f* command value
ḟ differential value
f̂ estimate value
f̄ average value
Each subscript symbol has the following meaning.
$f_s$ stator
$f_r$ rotor
$(\ )_{opt}$ appropriate value First Embodiment FIG. 1 is a configuration diagram of a motor system to which a controller for a power converter according to an embodiment 1 of the present invention is applied.

In FIG. 1, a motor system 1 includes a motor 2 and a motor driving system 3. For example, the electric motor 2 is an induction machine.

An output part of the motor 2 is connected to an input part of a load machine 4. For example, the load machine 4 is an inertia load. A speed sensor 119 for detecting the rotational speed of the rotor is connected to the electric motor 2.

An input part of the motor driving system 3 is connected to an output part of an AC power supply 5. For example, the AC power supply 5 is a grid.

The motor driving system 3 includes a diode rectifier 6, a capacitor 7, an inverter 8, a first current detector 9a, a second current detector 9b, and controller 11.

The diode rectifier 6 converts, into DC power, the three-phase AC power supplied from the AC power supply 5. If necessary, the diode rectifier 6 may be replaced with a PWM converter.

The capacitor 7 is provided across a DC link on the output side of the diode rectifier 6. The capacitor 7 is used to smooth the DC voltage applied to the DC link.

The inverter 8 is converts the DC power supplied from the diode rectifier 6 into three-phase AC power for driving the electric motor 2. The inverter 8 is a voltage source inverter. The inverter 8 is subjected to variable voltage variable frequency (VVVF) control through pulse width modulation (PWM) control.

The power conversion circuit of the inverter 8 is formed of three arms. One of the arms includes an upper arm and a lower arm. The upper and lower arms are each formed of at least one switching element.

The first current detector 9a is provided at the v-phase of the output side of the inverter 8. The first current detector 9a detects the v-phase stator current Ivs. The second current detector 9b is provided at the w-phase of the output side of the inverter 8. The second current detector 9b detects the w-phase stator current Iws.

The controller 11 includes a speed controller 12, a DB-DTFC calculation module 14, a first coordinate conversion module 15, PWM controller 16, a second coordinate conversion module 17, a current/flux estimation module 20, a speed/phase estimation module 21, a torque command limit module 13, an appropriate flux command generation module 18, a power supply angular frequency calculation module 19, and a first slip angular frequency estimation module 32.

The speed controller 12 is a torque command value calculation module. The speed controller 12 calculates the torque command value $T_{em1}^*$ so that the rotor mechanical angular speed estimated value $\hat{\omega}_{rm\text{-}r}$, which is detected by the speed/phase estimation module 21 will follow the rotor mechanical angular speed command value $\omega_{rm}^*$ obtained from an external device.

Here, the "dqs-axes" is such that the U phase and the q axis coincide of a stator with each other in a stationary axis system, and distributes the three phase components to two phases of the d axis and the q axis orthogonal to each other. The second coordinate conversion module 17, which will be described later, is a circuit that performs dq-axes conversion to replace the input signal with the biaxial signal. The first coordinate conversion module 15, which will be described later, is an inverse conversion circuit that restores the two phase signals converted into the d axis and the q axis in the stationary axis system to three phase signals in the stationary coordinate system.

For example, a superscript symbol "S" of the stator dqs-axes flux value $\lambda_{qds}^S$ represents the stationary coordinate system. A subscript symbol "qds" of the stator dqs-axes flux value $\lambda_{qds}^S$ represents "two phase components" of the stator flux. That is, the stator dqs-axes flux value $\lambda_{qds}^S$ represents the d-axis component $\lambda_{ds}^S$ of the stator flux value and the q-axis component $\lambda_{qs}^S$ of the stator flux command value. In the following description, symbols with the subscript suffix "qds" are the symbols representing both the d-axis component and the q-axis component of the stator flux.

On the other hand, a superscript symbol "S" of the rotor dqs-axes flux value $\lambda_{qdr}^S$ represents the stationary coordinate system. A subscript symbol "qdr" of the rotor dqs-axes flux value $\Delta_{qdr}^S$ represents the d-axis component $\lambda_{dr}^S$ of the rotor flux value and the q-axis component $\lambda_{qr}^S$ of the rotor flux value. In the following description, symbols with the subscript suffix "qdr" are the symbols representing both the d-axis component and the q-axis component of the rotor flux.

The torque command limit module 13 calculates the second torque command value $T_{em}^*$ based on the first torque command value $T_{em1}^*$ calculated by the speed control module 12, the stator flux command value $\lambda_{s\_opt}$ generated by the appropriate flux command generation module 18, and the power supply angular frequency $\omega_e$ calculated by the power supply angular frequency calculation module 19. Details of the torque command limit module 13 will be described later with reference to FIG. 2.

The DB-DTFC calculation module 14 calculates the stator dqs-axes voltage command value $V_{qds}^{S*}$ based on the second torque command value $T_{em}^*$, the flux command value $\lambda_s^*$, the stator dqs-axes flux estimated value $\hat{\lambda}_{ds}^S$ the rotor dqs-axes flux estimated value $\hat{\lambda}_{qdr}^S$, and the rotor mechanical angular speed estimated value $\hat{\omega}_{rm\text{-}r}$ estimated by the speed/phase estimation module 21 which is described later. The flux command value $\lambda_s^*$ is a stator flux command value $\lambda_{s\_opt}$ generated by the appropriate flux command generation module 18. The DB-DTFC calculation module 14 employs, as a control method, a deadbeat direct torque & flux control (DB-DTFC) method.

The first coordinate conversion module 15 converts the stator dqs-axes voltage command value $V_{qds}^{S*}$ into three-phase stator voltage command values $V_{us}^*, V_{vs}^*$, and $V_{ws}^*$. The conversion performed by the first coordinate conversion module 15 is an inverse conversion of the dqs-axes transformation.

The PWM controller 16 converts the three-phase stator voltage command values $V_{us}^*, V_{vs}^*$, and $V_{ws}^*$ into gate pulses for the inverter 8 based on the pulse width modulation. The PWM controller 16 outputs the gate pulses to the inverter 8.

The second coordinate conversion module 17 converts the stator currents Ivs, Iws into a stator dqs-axes current measured value $i_{qds}{}^s$. The conversion performed by the second coordinate conversion module 17 is "dqs-axes conversion".

Three-phase to two-phase conversion by dqs-axes conversion is performed based on the following equation. For example, if the currents of three phases are $I_u$, $I_v$, $I_w$ and the currents after two-phase conversion are $I_{ds}$, $I_{qs}$, the following equation is obtained.

$$I_u + I_v + I_w = 0$$

$$I_{qs} = I_u$$

$$I_{ds} = (I_u + 2I_w)/\sqrt{3}$$

This conversion is somewhat different from Clarke conversion which is a general three-phase to two-phase conversion.

The appropriate flux command generation module 18 generates the stator flux command value $\lambda_{s\_opt}$ by performing calculation on an appropriate flux command based on the power supply angular frequency $\omega_e$ calculated by the power supply angular frequency calculation module 19. The stator flux command value $\lambda_{s\_opt}$ having an appropriate value is input to the DB-DTFC calculation module 14 as the flux command value $\lambda_s^*$. The appropriate flux command generation module 18 will be described later in detail with reference to FIG. 2.

The power supply angular frequency calculation module 19 calculates the power supply angular frequency $\omega_e$ based on the rotor mechanical angle estimated value $\hat{\omega}_{rm\text{-}r}$ estimated by the speed/phase estimation module 21 and the slip angular frequency estimated value $\hat{\omega}_{sl}$ estimated by the first slip angular frequency estimation module 32. The relationship between the detected rotational speed $\overline{\omega}_{rm}$ from the speed sensor 119 and the estimated value $\omega_{rm\text{-}r}$ will be described later with reference to FIG. 3. Details of the power supply angular frequency calculation module 19 will be described later with reference to FIG. 2.

It should be noted that the output value of the speed sensor 119 is not the instantaneous value but the average speed between the detection timings, and thus the output value of the speed sensor 119 is expressed as $\overline{\omega}_{rm}$ using the symbol indicating the average value.

Here, the stator dqs-axes current measured value $i_{qds}{}^s$ and the stator dqs-axes voltage measured value $V_{qds}{}^s$ are values obtained by dqs converting the three phase measured values. The total sum of the instantaneous values of the three-phase currents, which is the output of the inverter 8, is zero. By using this property, in the first embodiment, two-phase current is detected, and for the other phase, a value obtained by inverting the sign of the added value of two-phase current is used.

The current/flux estimation module 20 calculates the stator dqs-axes flux estimated value $\hat{\lambda}_{qds}{}^s$ and the rotor dqs-axes flux estimated value $\hat{\lambda}_{qdr}{}^s$ as a flux estimation module based on the rotor electrical angle estimated value $\hat{\theta}_r$ estimated by the speed/phase estimation module 21, the voltage command value $V_{qds}{}^{s*}$, the stator dqs-axes current measured value $i_{qds}{}^s$, the rotor mechanical angular speed estimated value $\hat{\omega}_{rm\text{-}r}$.

Figure 3:
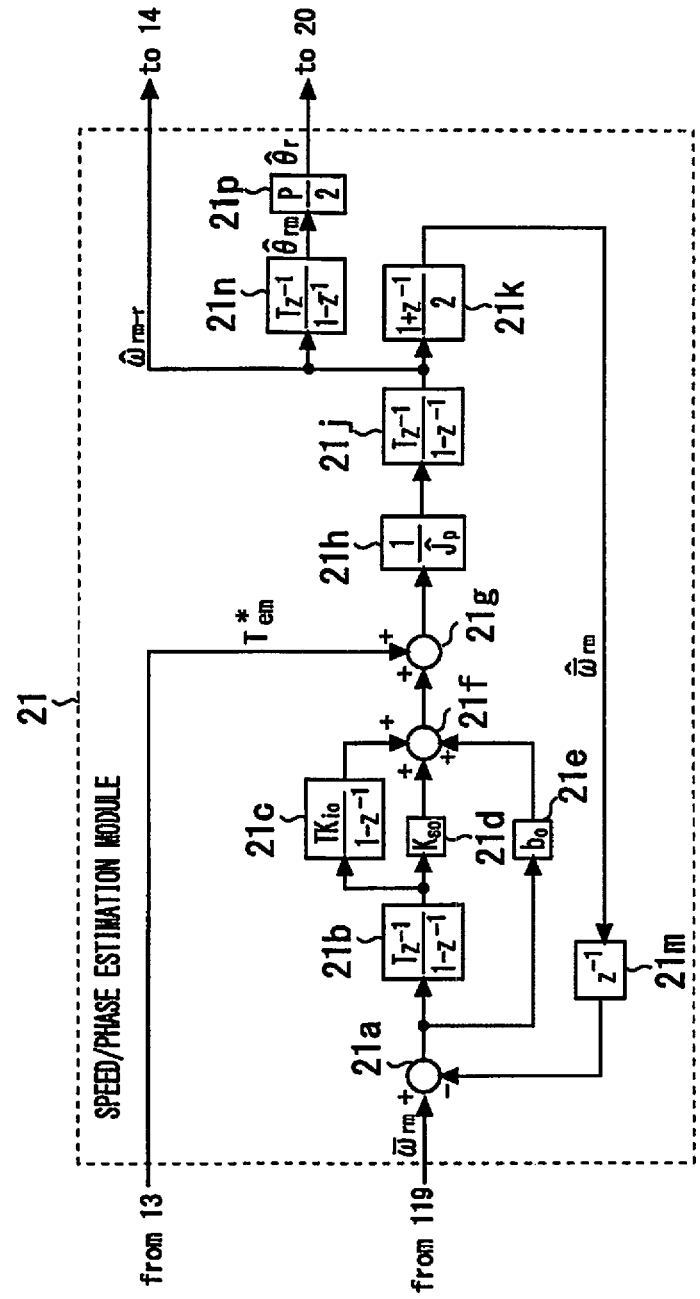
FIG. 3 is an enlarged configuration diagram of part of the controller for a power convertor according to the first embodiment.

A speed and phase estimation module 21 as a motor speed estimation module calculates a rotor electrical angle estimated value $\hat{\theta}_r$ and a rotor mechanical angular speed estimated value $\hat{\omega}_{rm\text{-}r}$ based on the second torque command value $T_{em}^*$ and a measurement value $\overline{\omega}_{rm}$ obtained by a speed sensor 119. The speed and phase estimation module 21 is what is called a motion observer, and the configuration thereof is illustrated in FIG. 3. The motion observer estimates a speed and a phase at subsequent sampling based on a speed of the motor 2 or detected phase obtained from an output from the speed sensor 119 and a torque command. The motion observer can obtain an instantaneous speed of the motor 2 at each sampling without phase delay.

The speed/phase estimation module 21 basically performs a calculation such that a torque command value is divided by a moment of inertia of the motor 2 to calculate an acceleration value, the acceleration value is integrated to calculate a speed, and the speed is integrated to calculate a phase. The delay operator is used in the speed/phase estimation module 21.

The rotational speed $\overline{\omega}_{rm}$ of the motor 2, which is an output of the speed sensor 119, is inputted into the subtraction module 21a. The subtraction module 21a calculates a difference between the rotational speed $\overline{\omega}_{rm}$ and an output of the delay calculation module 21m. The calculated difference is transmitted to the integral module 21b and the proportional module 21e. The integral module 21b integrates an output of the subtraction module 21a. The integrated value by the integral module 21b is transmitted to the integral module 21c and the proportional module 21d.

The integral module 21c is an integration circuit having a gain Kio. The integral module 21c outputs a calculation result to the adder module 21f. The proportional module 21d performs amplification by a gain $K_{so}$. The proportional module 21d outputs a calculation result to the adder module 21f. The proportional module 21e performs amplification by a gain bo. The proportional module 21e outputs a calculation result to the adder module 21f.

The adder module 21f performs addition of the output from the integral module 21c, the output from the proportional module 21d, and the output from the proportional module 21e, and outputs the calculation result to the adder module 21g. The adder module 21g performs addition of the second torque command value $T_{em}^*$, which is the output from the torque command limit module 13, and the output from the adder module 21f, and then outputs a calculation result to the acceleration value calculation module 21h.

The acceleration value calculation module 21h divides an inputted value by the moment of inertia estimated value $\hat{j}_p$ of the motor 2, and then outputs the estimated acceleration value to the integral module 21j. The integral module 21j integrates the inputted estimated acceleration value to estimate the rotor mechanical angular speed estimated value $\hat{\omega}_{rm\text{-}r}$.

The rotor mechanical angular speed estimated value $\hat{\omega}_{rm\text{-}r}$ is transmitted to the integral module 21n and the average value calculation module 21k. The rotor mechanical angular speed estimated value $\hat{\omega}_{rm\text{-}r}$ is also transmitted to the outside of the speed/phase estimation module 21. The outside of the speed/phase estimation module 21 is for example the DB-DTFC calculation module 14. Further, the rotor mechanical angular speed estimated value $\hat{\omega}_{rm\text{-}r}$ is also transmitted to the current and flux estimation module 20, the power supply angular frequency calculation module 19, and the speed control module 12.

The integral module 21n integrates the rotor mechanical angular speed estimated value $\hat{\omega}_{rm\text{-}r}$ to calculate the estimated phase (mechanical angle) $\hat{\theta}_{rm}$. The estimated phase (mechanical angle) $\hat{\theta}_{rm}$ is inputted to the proportional module 21p. The proportional module 21p multiples the estimated phase (mechanical angle) $\hat{\theta}_m$ by the pole number P/2 of the motor 2 to calculate the estimated phase (electrical angle) $\hat{\theta}_r$. The estimated phase (electrical angle) $\hat{\theta}_r$ is outputted to the outside of the speed/phase estimation module 21. The outside of the speed/phase estimation module 21 is for example the current and flux estimation module 20.

The average value calculation module 21$k$ calculates the average value $\hat{\omega}_{rm}$ with respect to the rotor mechanical angular speed estimated value $\hat{\omega}_{rm\_r}$ by calculating an average of an estimated value in the present calculation period and another estimated value before one calculation period, and then outputs the calculation result to the delay calculation module 21$m$. The delay calculation module 21$m$ performs a calculation to delay the average value $\hat{\omega}_{rm}$ by one calculation period, and then outputs a calculation result to the subtraction module 21$a$ as a subtraction value. It should be noted that, the configuration in FIG. 3 may be modified in other system, and the output from the speed sensor 119 may be a low pass filter, and an output from the low pass filter may be regarded as the rotor mechanical angular speed estimated value $\hat{\omega}_{rm\_r}$.

Voltage, current, and flux always change in the dqs-axes coordinate in the steady state. On the other hand, speed is constant, and the influence of the phase delay need not to be considered. By using the motion observer, phase and speed information with little noise can be obtained without phase delay.

Figure 2:
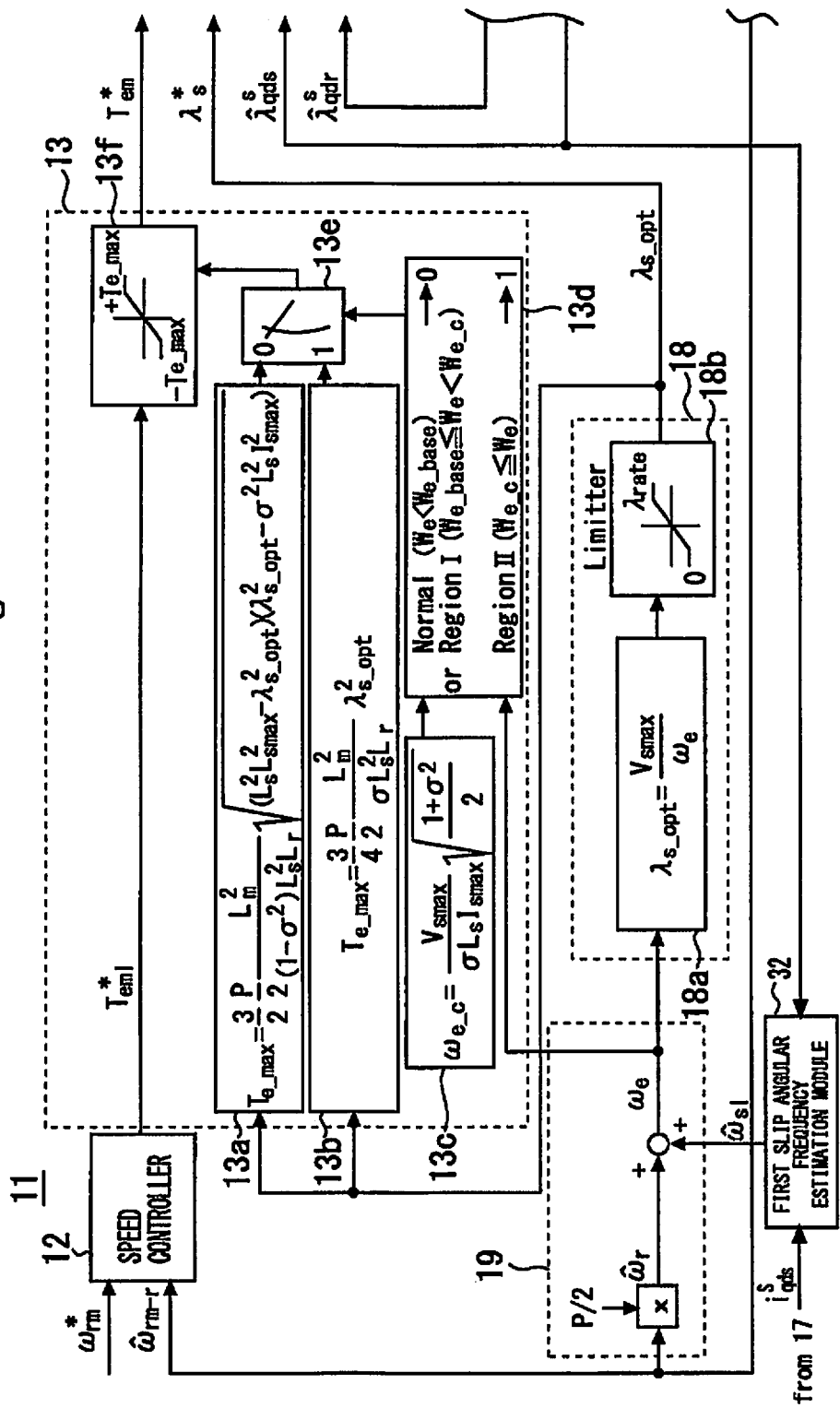
FIG. 2 is an enlarged configuration diagram of part of the controller for a power convertor according to the first embodiment.

FIG. 2 is an enlarged configuration diagram of part of the controller for a power convertor according to the first embodiment. As illustrated in FIG. 2, this controller 11 includes the speed control module 12, the torque command limit module 13, the appropriate flux command generation module 18, and the power supply angular frequency calculation module 19.

The torque command limit module 13 includes a first block 13$a$, a second block 13$b$, a third block 13$c$, a fourth block 13$d$, a fifth block 13$e$, and a sixth block 13$f$.

The first block 13$a$ calculates an upper limit torque command value $T_{e\_max}$ based on the stator flux command value $\lambda_{s\_opt}$ in accordance with Expression (30) to be described later. Expression (30) is a predetermined first calculation formula for upper limit torque command value calculation. A second-order polynomial including the second-order term ($\lambda_{s\_opt}^2$) of the stator flux command value $\lambda_{s\_opt}$ and the first-order term ($\lambda_{s\_opt}$) thereof is derived by expanding the expression in the square root in Expression (30).

The second block 13$b$ calculates the upper limit torque command value $T_{e\_max}$ based on the stator flux command value $\lambda_{s\_opt}$ in accordance with Expression (36) to be described later. Expression (36) is a predetermined second calculation formula for upper limit torque command value calculation. Expression (36) is a monomial obtained by multiplying the second-order term ($\lambda_{s\_opt}^2$) of the stator flux command value by a predetermined coefficient. The predetermined coefficient is $$\frac{3}{4}\frac{P}{2}\frac{L_m^2}{\sigma L_s^2 L_r}.$$

The third block 13$c$ calculates a boundary speed $\omega_{e\_c}$ in accordance with Expression (34) to be described later. The boundary speed $\omega_{e\_c}$ is a speed predetermined to be higher than a field weakening starting point, and determined by Expression (34). The field weakening starting point may be, for example, the rated speed of a motor.

The fourth block 13$d$ determines a speed region based on the power supply angular frequency $\omega_e$ and the boundary speed $\omega_{e\_c}$. The speed region is divided into a normal operation region, Region I, and Region II. Region I is a region between the boundary speed $\omega_{e\_c}$ and the field weakening starting point. Region II is a region higher than the boundary speed $\omega_{e\_c}$.

Specifically, the fourth block 13$d$ determines the speed region in accordance with the power supply angular frequency $\omega_e$ as follows. The field weakening starting speed is defined as $\omega_{base}$. When $\omega_e < \omega_{base}$, it is determined the speed is in the normal operation region. When $\omega_{base} \leq \omega_e < \omega_{e\_c}$, it is determined that the speed is in Region I (a first field weakening region). When $\omega_{e\_c} \leq \omega_e$, it is determined that the speed is in Region II (a second field weakening region). The fourth block 13$d$ outputs "0" when the current speed is in the normal operation region or Region I. The fourth block 13$d$ outputs "1" when the current speed is in Region II.

When the output from the fourth block 13$d$ is "0", the fifth block 13$e$ selects the upper limit torque command value $T_{e\_max}$ output from the first block 13$a$. When the output from the fourth block 13$d$ is "1", the fifth block 13$e$ selects the upper limit torque command value $T_{e\_max}$ output from the second block 13$b$. The fifth block 13$e$ transmits the selected upper limit torque command value $T_{e\_max}$ to the sixth block 13$f$.

The sixth block 13$f$ determines a torque limiter range by using the upper limit torque command value $T_{e\_max}$ transmitted from the fifth block 13$e$. The torque limiter range is a range defined by an upper limit torque value (+$T_{e\_max}$) and a lower limit torque value (−$T_{e\_max}$). The upper limit torque value is the upper limit torque command value $T_{e\_max}$. The lower limit torque value is a value obtained by multiplying the upper limit torque value by a negative coefficient. The negative coefficient is a predetermined value, and may be "−1" or a value other than minus one. Also, instead of this negative coefficient, the lower limit torque value may be set to zero by multiplying zero by the upper limit torque value.

When the first torque command value $T_{em1}^*$ is in the torque limiter range, the sixth block 13$f$ substitutes the first torque command value $T_{em1}^*$ directly into the second torque command value $T_{em}^*$. When the first torque command value $T_{em1}^*$ is larger than the upper limit torque value +$T_{e\_max}$, the sixth block 13$f$ substitutes the upper limit torque value +$T_{e\_max}$ into the second torque command value $T_{em}^*$. When the first torque command value $T_{em1}^*$ is smaller than the lower limit torque value −$T_{e\_max}$, the sixth block 13$f$ substitutes the lower limit torque value −$T_{e\_max}$ into the second torque command value $T_{em}^*$.

In this manner, the sixth block 13$f$ functions as a filter that allows only a torque command value in the torque limiter range to pass through. Accordingly, the sixth block 13$f$ generates the second torque command value $T_{em}^*$. The second torque command value $T_{em}^*$ is a value obtained by correcting the first torque command value $T_{em1}^*$ so that the first torque command value $T_{em1}^*$ is limited to the torque limiter range.

The appropriate flux command generation module 18 includes a first block 18$a$ and a second block 18$b$. The appropriate flux command generation module 18 generates the stator flux command value $\lambda_{s\_opt}$ in accordance with the power supply angular frequency $\omega_e$.

The first block 18$a$ calculates the stator flux command value $\lambda_{s\_opt}$ in accordance with Expression (29) to be described later. The first block 18$a$ calculates a value obtained by dividing a stator voltage maximum value $V_{max}$ by the power supply angular frequency $\omega_e$.

The second block 18$b$ limits the stator flux command value $\lambda_{s\_opt}$ calculated by the first block 18$a$ to a certain range. The second block 18$b$ employs a predetermined upper limiter flux value and limits the stator flux command value $\lambda_{s\_opt}$ to be equal to or smaller than the upper limiter flux value. The upper limiter flux value may be the rated stator flux $\lambda_{rate}$ as one of parameters of the motor in the embodiment.

The power supply angular frequency calculation module 19 calculates the rotor electrical angular speed estimated value $\hat{\omega}_r$ by multiplying the rotor mechanical angular speed estimated value $\hat{\omega}_{rm-r}$ calculated by the speed and phase estimation module 21 by P/2. The value P is the pole number of the motor 2. The power supply angular frequency calculation module 19 calculates the power supply angular frequency $\omega_e$ by adding the rotor mechanical angular speed estimated value $\hat{\omega}_{rm-r}$ and a slip angular frequency estimated value $\hat{\omega}_{sl}$ outputted from a first slip angular estimation module 32.

The slip angular frequency estimated value $\hat{\omega}_{sl}$ may be estimated by Expressions (43) or (44), as described later. In the first embodiment, the rotor dqs-axes flux estimated value $\lambda_{qds}^S$ outputted from the current/flux estimation module 20 and the rotor dqs-axes current measured value $i_{qds}^s$ outputted from the second the second coordinate conversion module 17 are inputted to the first slip angular estimation module 32. The first slip angular estimation module 32 performs a calculation based on Expression (43) to estimate the slip angular frequency estimated value $\hat{\omega}_{sl}$.

Device Operation According to the First Embodiment

The following describes a theory for increasing an output torque in a field weakening region in DB-DTFC control. Expressions (1) to (4) are equations for an induction machine in an optional coordinate system.

$$V_{qds} = R_s i_{qds} + j\omega \lambda_{qds} + p\lambda_{qds} \tag{1}$$

$$0 = R_r i_{qdr} + j(\omega - \omega_r)\lambda_{qdr} + p\lambda_{qdr} \tag{2}$$

$$\lambda_{qds} = L_s i_{qds} + L_m i_{qdr} \tag{3}$$

$$\lambda_{qdr} = L_r i_{qdr} + L_m i_{qds} \tag{4}$$

A stator-side voltage equation in a synchronous coordinate system (synchronous with the power supply frequency) of the induction machine can be given by Expression (5).

$$V_{qds}^e = R_s i_{qds}^e + j\omega^e \lambda_{qds}^e + p\lambda_{qds}^e \tag{5}$$

Any differential term can be omitted in a steady state, and thus Expression (5) becomes Expression (6).

$$V_{qds}^e = R_s i_{qds}^e + j\omega_e \lambda_{qds}^e \tag{6}$$

The term of the power supply angular frequency $\omega_e$ is dominant in a high speed range, and thus finally, Expression (7) is obtained.

$$V_{qds}^e = j\omega_e \lambda_{qds}^e \tag{7}$$

It is clear from Expression (7) that a voltage upper limit is reached as the speed increases. In such a case, $\omega_e$ can be increased by decreasing the flux. This is called field weakening.

One of features of the embodiment is a method of determining a flux command for achieving an increased torque in the high frequency region.

1. Output Torque Increasing Technique

Studies performed by the inventor of the present application have found a novel torque output increasing technology, the contents of which will be described below.

1.1 Stator Flux Limit with the Voltage and Current Limits Taken into Account 1.1.1 Restriction of Stator Voltage (Voltage Limit) by Maximum Output Voltage of Inverter The stator voltage maximum value $V_{max}$ is limited by a DC voltage $V_{dc}$ of the inverter and a modulation method. The stator voltage maximum value $V_{max}$ is $V_{smax} = V_{dc}/2$ for sinusoidal wave pulse width modulation (SPWM), or $V_{smax} = V_{dc}/\sqrt{3}$ for space vector pulse width modulation (SVPWM). If necessary, in deriving the maximum value Vsmax of the stator voltage, an influence of a forward voltage drop or a dead time of switching elements constituting the inverter 8 may be taken into consideration.

Another point is, if necessary, a coefficient slightly smaller than 1, for example 0.98, can be used to calculate Vsmax to account for the voltage drop on the stator resistance.

Expression (7) gives a dqs-axes complex vector. Expression (8) is a voltage limit expression obtained from Expression (7).

$$(\lambda_{qs}^e)^2 + (\lambda_{ds}^e)^2 \leq \frac{V_{smax}^2}{\omega_e^2} \tag{8}$$

Figure 4:
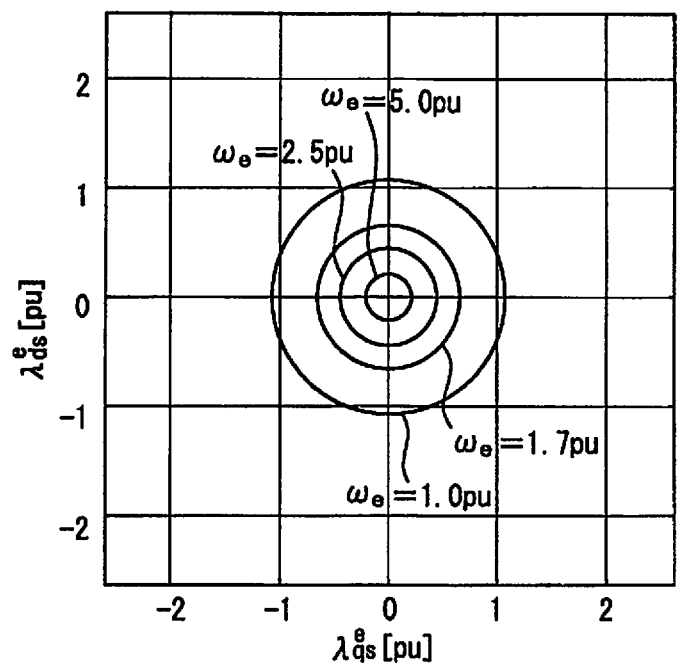
FIG. 4 is a graph illustrating a stator flux locus for each power supply (operation) frequency with a voltage limit taken into account.

FIG. 4 is a graph illustrating a stator flux locus for each power supply (operation) frequency with a voltage limit taken into account. A voltage limit is illustrated as a circle in FIG. 4. The radius of each circle in FIG. 4 represents an allowable stator flux amplitude. The radius (upper limit of the allowable stator flux amplitude) decreases as the power supply (operation) angular frequency $\omega_e$ increases. The vertical axis expresses the stator d-axis flux on general synchronous reference frame $\lambda_{ds}^e$, and the horizontal axis expresses the stator q-axis flux on general synchronous reference frame $\lambda_{qs}^e$ in FIG. 10 from FIG. 4 respectively.

1.1.2 Limit of Stator Current by Allowable Output Current of Inverter (Current Limit)

In addition to the voltage limit, another limit is placed on the stator flux amplitude. This limit is an allowable output current limit of the inverter 8 and allowable current through the motor 2. The Maximum Allowable Current $I_{smax}$ is Expressed by Expression (9).

$$(i_{qs}^e)^2 + (i_{ds}^e)^2 \leq I_{smax}^2 \tag{9}$$

To use the stator flux in control, a relational expression between the stator current and the stator flux is derived. In the stationary state, Expression (2) as a voltage equation for the rotor becomes Expression (10).

$$0 = R_r i_{qdr}^e + j(\omega_e - \omega_r)\kappa_{qdr}^e \tag{10}$$

When Expression (10) is rewritten for the q-axis and d-axis components separately, Expressions (11) and (12) below are obtained.

$$0 = R_r i_{qr}^e + (\omega_e - \omega_r)\lambda_{dr}^e \tag{11}$$

$$0 = R_r i_{dr}^e + (\omega_e - \omega_r)\lambda_{qr}^e \tag{12}$$

Expressions (11) and (12) are simplified by performing coordinate transformation on the rotor flux so that Expressions (13) and (14) are obtained.

$$\lambda_{dr}^e = \lambda_r \tag{13}$$

$$\lambda_{qr}^e = 0 \tag{14}$$

From Expressions (12) and (14), a rotor-side d-axis current on the synchronous coordinate system is given by Expression (15).

$$0 = i_{dr}^e \quad (15)$$

Expression (4) is rewritten in a manner divided for the q and d axes.

$$\lambda_{qs}^e = L_s i_{qs}^e + L_m i_{qr}^e \quad (16)$$

$$\lambda_{ds}^e = L_s i_{ds}^e + L_m i_{dr}^e \quad (17)$$

From Expressions (15) and (17), Relation Expression (18) between the stator current and the stator flux on the d-axis side can be obtained.

$$\lambda_{ds}^e = L_s i_{ds}^e \quad (18)$$

Then, a relational expression between the stator current and the stator flux on the q-axis side is obtained. Expression (3) is rewritten in a manner divided for the d and q-axes.

$$\lambda_{qr}^e = L_m i_{qs}^e + L_r i_{qr}^e \quad (19)$$

$$\lambda_{dr}^e = L_m i_{ds}^e + L_r i_{dr}^e \quad (20)$$

Expression (21) can be obtained from Expressions (14) and (19).

$$i_{qr}^e = -\frac{L_m}{L_r} i_{qs}^e \quad (21)$$

Lastly, the relational expression between the stator current and the stator flux on the q-axis side can be obtained from Expressions (16) and (21). In the expression, σ represents a leakage coefficient listed in a symbol list.

$$\lambda_{qs}^e = \left(L_s - \frac{L_m^2}{L_r}\right) i_{qs}^e = \sigma L_s i_{qs}^e \quad (22)$$

The current-voltage relation expressions (18) and (22) on the d-axis and q-axis sides are substituted into the current limit expression (9) to finally obtain a current limit expression (23).

$$\left(\frac{\lambda_{qs}^e}{\sigma L_s}\right)^2 + \left(\frac{\lambda_{ds}^e}{L_s}\right)^2 \le I_{smax}^2 \quad (23)$$

Figure 5:
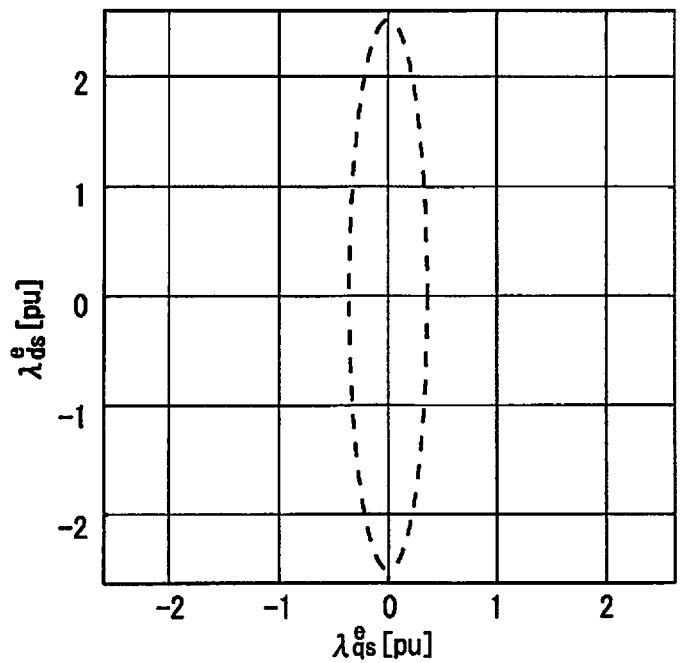
FIG. 5 is a graph illustrating a stator flux locus with a current limit taken into account.

When illustrated on a stator flux plane, the expression depicts an ellipse as illustrated in FIG. 5. FIG. 5 is a graph illustrating a stator flux locus with a current limit taken into account.

1.1.3 Voltage and Current Limits

Figure 6:
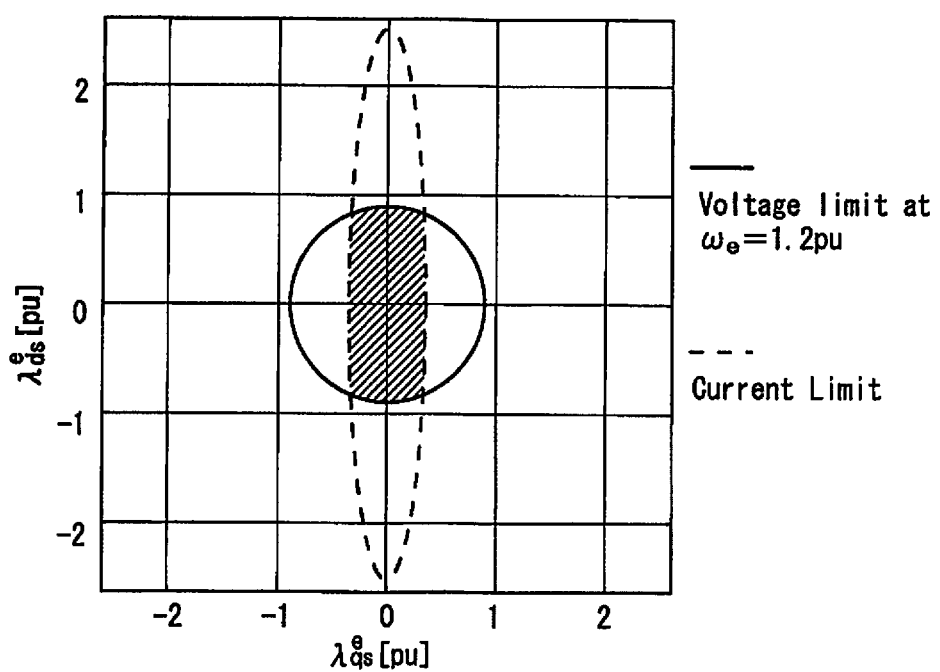
FIG. 6 is a graph illustrating stator flux loci with the voltage and current limits taken into account.

FIG. 6 is a graph illustrating stator flux loci with the voltage and current limits taken into account. As described above in Sections 1.1 and 1.2, the voltage and current limits of the inverter depict a circle and an ellipse, respectively, on the stator flux plane. These results indicate that, in theory, the stator flux exists in a hatched region common to the voltage limit circle and the current limit ellipse illustrated in FIG. 6. Thus, to increase the output torque in the field weakening region, an appropriate combination of d-axis and q-axes flux command vectors need to be selected from the hatched region.

1.2 Stator Flux for Achieving Increased Torque

As described in the previous section, a combination of (d-axis and q-axes) stator flux command vectors are limited by the current and voltage limits of the inverter. Achievable torque differs between stator flux command vectors. The present section derives stator flux for achieving increased torque.

1.2.1 Torque Formula (Expression Only with Stator Flux)

A torque formula is expressed as Expression (24). This formula is expressed only with the stator flux to depict torque on the dqs-axes plane of the stator flux.

$$T_e = \frac{3}{2}\frac{P}{2}\frac{L_m}{\sigma L_s L_r}(\lambda_{qs}\lambda_{dr} - \lambda_{ds}\lambda_{qr}) \quad (24)$$

Expression (25) can be obtained from Expressions (15), (18), and (20).

$$\lambda_{dr}^e = \frac{L_m}{L_s}\lambda_{ds}^e \quad (25)$$

Torque Formula (26) expressed only with the stator flux can be obtained from Expressions (14), (24), and (25).

$$T_e = \frac{3}{2}\frac{P}{2}\frac{L_m^2}{\sigma L_s^2 L_r}\lambda_{qs}^e \lambda_{ds}^e \quad (26)$$

Expression (26) indicates that the stator flux locus depicts a hyperbola on the dqs-axes flux plane when the torque is constant.

Figure 7:
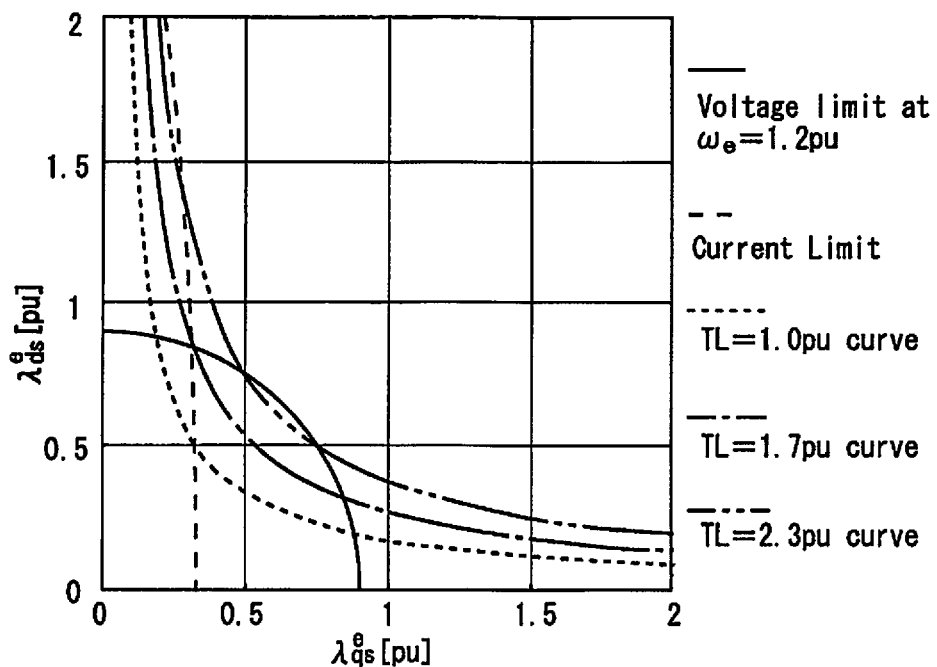
FIG. 7 is a graph illustrating voltage and current limits and torque curves at a power supply frequency of 1.2 pu.

FIG. 7 is a graph illustrating voltage and current limits and torque curves at a power supply frequency of 1.2 pu. FIG. 7 exemplarily illustrates three torque curves having different sizes in addition to voltage and current limits at a power supply frequency of 1.2 pu.

When the power supply frequency is 1.2 pu, the number of combinations of stator fluxes satisfying the voltage and current limits is infinite for TL=1.0 pu. However, the number of such combinations is one for TL=1.7 pu. This is a maximum torque achievable in theory. Both limits cannot be satisfied for TL=2.3 pu, and thus this torque cannot be achieved.

The radius of the voltage limit circle decreases as the power supply frequency increases. Accordingly, no torque curve exists in a region common to the current limit ellipse and the voltage limit circle. A maximum torque is achieved at a contact point between a torque curve and the voltage limit circle. This point is a point of transition from Region I to Region II, which will be described later.

Specifically, in a particular region, the stator flux is limited by two limits, namely, the current and voltage limits. In the other region, however, the stator flux is limited by one limit, namely, the voltage limit. A flux command needs to be determined in each region due to this limit difference.

The above-described two field weakening regions are referred to as Region I and Region II. The following describes Region I, Region II, and a boundary point between these regions. The relation between each region and the speed is listed below with description of terms.

$\omega_e < \omega_{base}$: Normal operation region $\omega_{base} \le \omega_e < \omega_{e\_c}$: Region I (first field weakening region)

$\omega_{e\_c} \le \omega_e$: Region II (second field weakening region)

$\omega_{e\_c}$: Boundary speed between Regions I and II
$\omega_{base}$: Field weakening start speed $$\omega_{base} = \frac{V_{smax}}{|\lambda_{qds\_rate}|}$$

The field weakening starting point $\omega_{base}$ is determined by the stator voltage and the rated flux. In the first embodiment, it is assumed that field weakening automatically starts at voltage saturation.

1.2.2 Stator flux in Region I ($\omega_{base} < \omega_e < \omega_{e\_c}$)

Figure 8:
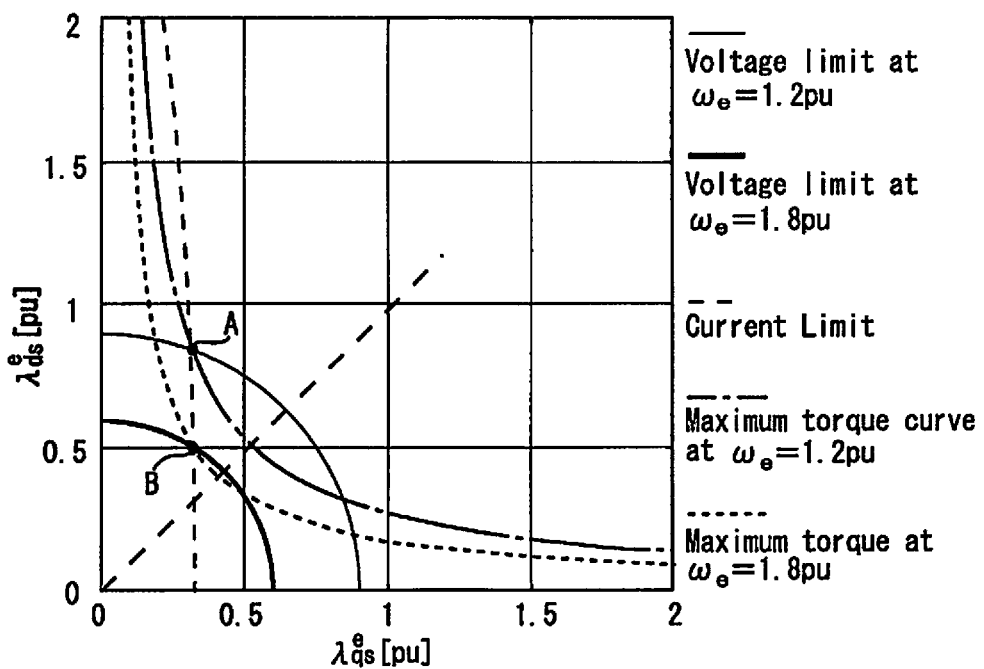
FIG. 8 is a graph illustrating maximum torque curves with the voltage and current limits taken into account at different speeds in Region I.

FIG. 8 is a graph illustrating a maximum torque curve with the voltage and current limits taken into account at different speeds in Region I. Region I corresponds to a case in which the power supply (operation) angular frequency $\omega_e$ exceeds a rated speed.

As illustrated in FIG. 8, when the operation frequency is not too high, an intersection point between the current limit ellipse and the voltage limit circle exists above the straight line of $\lambda_{ds}^e = \lambda_{qs}^e$. This operation frequency band is defined to be Region I.

In Region I, a stator flux for achieving the maximum torque is at the intersection point between the current limit ellipse and the voltage limit circle. In FIG. 8, the maximum torque is achieved at operation point A for $\omega_e = 1.2$ pu and at operation point B for $\omega_e = 1.8$ pu.

Stator flux command vectors satisfying the intersection point are given by Expressions (27) and (28) due to the voltage and current limits.

$$\lambda_{qs\_opt}^e = \sqrt{\frac{\sigma^2 L_s^2 I_{smax}^2 - \frac{\sigma^2 V_{smax}^2}{\omega_e^2}}{1 - \sigma^2}} \quad (27)$$

$$\lambda_{ds\_opt}^e = \sqrt{\frac{\frac{V_{smax}^2}{\omega_e^2} - \sigma^2 L_s^2 I_{smax}^2}{1 - \sigma^2}} \quad (28)$$

The amplitude of the stator flux is limited by Expression (29) as the radius of the voltage limit circle.

$$\lambda_{s\_opt} = \frac{V_{smax}}{\omega_e} \quad (29)$$

Expression (30), which calculates the maximum torque in the field weakening region I, is obtained from Expressions (26) to (29).

$$T_{e\_max} = \frac{3}{2}\frac{P}{2}\frac{L_m^2}{\sigma L_s^2 L_r}\lambda_{qs\_opt}^e \lambda_{ds\_opt}^e = \quad (30)$$
$$\frac{3}{2}\frac{P}{2}\frac{L_m^2}{(1-\sigma^2)L_s^2 L_r}\sqrt{(L_s^2 I_{smax}^2 - \lambda_{s\_opt}^2)(\lambda_{s\_opt}^2 - \sigma^2 L_s^2 I_{smax}^2)}$$

1.2.3 Stator flux ($\omega_{e\_c} < \omega_e$) in Region II

The intersection point between the ellipse and the circle is below the straight line of $\lambda_{ds}^e = \lambda_{qs}^e$ at a higher speed. No intersection point exists at a further higher speed. An operation frequency band in which these phenomena occur is defined to be Region II.

Figure 9:
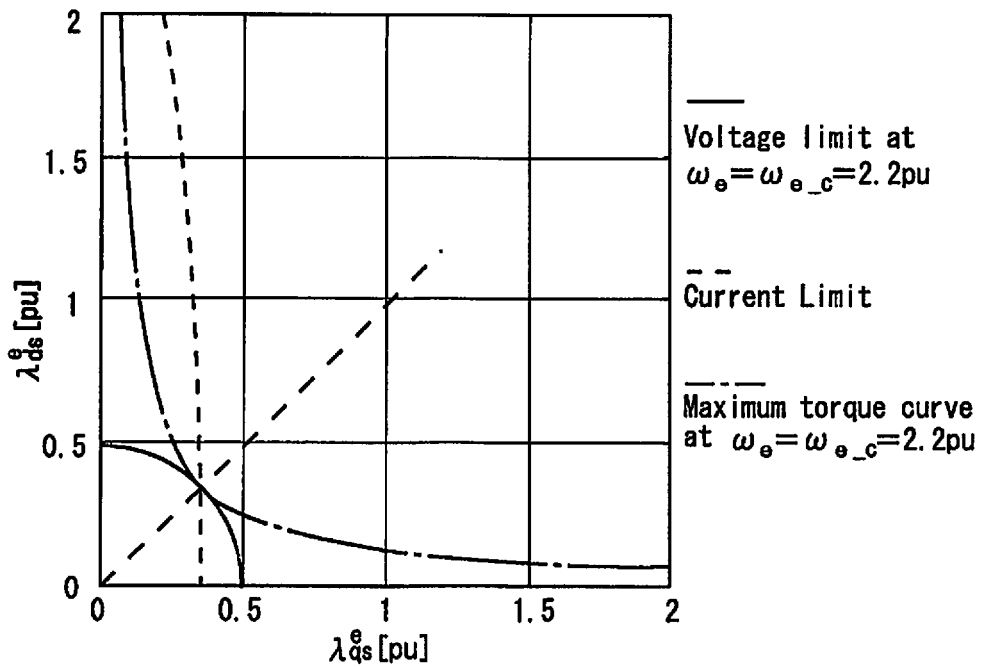
FIG. 9 is a graph indicating a boundary speed condition between Region I and Region II.

FIG. 9 illustrates a condition on the boundary speed between Regions I and II. FIG. 9 is a graph indicating the condition on the boundary speed between Regions I and II. The boundary speed $\omega_{e\_c}$ is calculated by Expressions (31) to (33) below.

Here, among the stator flux $\lambda_{qds\_c}^e$, the $\lambda_{qs\_c}^e$ represents the q-axis component of the stator flux at the boundary speed, and the $\lambda_{ds\_c}^e$ represents the d-axis component of the stator flux at the boundary speed.

$$(\lambda_{qs\_c}^e)^2 + (\lambda_{ds\_c}^e)^2 = \frac{V_{smax}^2}{\omega_{e\_c}^2} \quad (31)$$

$$\left(\frac{\lambda_{qs\_c}^e}{\sigma L_s}\right)^2 + \left(\frac{\lambda_{ds\_c}^e}{L_s}\right)^2 = I_{smax}^2 \quad (32)$$

$$\lambda_{qs\_c}^e = \lambda_{ds\_c}^e \quad (33)$$

The boundary speed $\omega_{e\_c}$ is finally obtained by Expression (34).

$$\omega_{e\_c} = \frac{V_{smax}}{\sigma L_s I_{smax}}\sqrt{\frac{1+\sigma^2}{2}} \quad (34)$$

Figure 10:
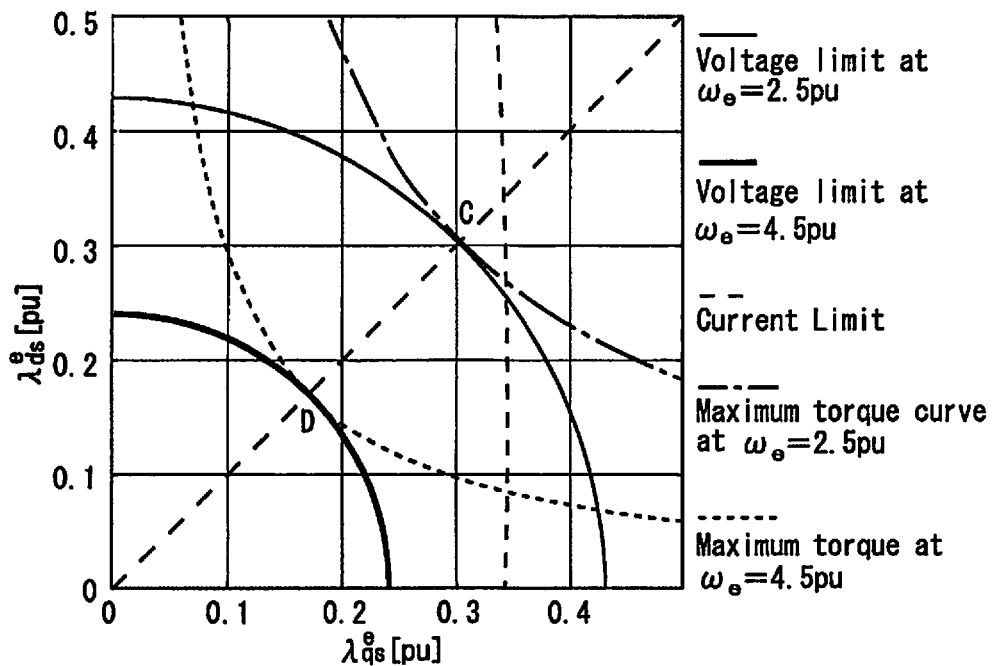
FIG. 10 is a graph illustrating maximum torque curves with the voltage and current limits taken into account at different speeds in Region II.

FIG. 10 is a graph illustrating maximum torque curves with the voltage and current limits taken into account at different power supply angular frequencies in Region II. The maximum torque is achieved at points C and D illustrated in FIG. 10 for different operation speeds, respectively. A stator flux command vector for achieving the maximum torque in Region II can be obtained by Expression (35).

$$\lambda_{qs\_opt}^2 = \lambda_{ds\_opt}^2 = \frac{V_{smax}}{\sqrt{2}\,\omega_e} \quad (35)$$

Similarly to Region I, the stator flux command amplitude is limited by Expression (29). The maximum torque achievable in the field weakening region II is expressed as Expression (36). Expression (36) is derived from Expressions (26), (29), and (35).

$$T_{e\_max} = \frac{3}{4}\frac{P}{2}\frac{L_m^2}{\sigma L_s^2 L_r}\lambda_{s\_opt}^2 \quad (36)$$

One of differences between Regions I and II is that the current is constantly lower than the current limit (upper limit) due to a condition on the maximum torque achievable in Region II. As a result, a stator flux amplitude for achieving the maximum torque is determined by the radius of the voltage limit circle in both of Regions I and IL.

1.2.4 Control Block for Torque Increasing

The entire image of the above-described control is illustrated in FIGS. 1 to 3. The stator flux command is generated by the first block 18*a* inside the appropriate flux command generation module 18 in accordance with Expression (29) based on the power supply frequency and the stator voltage.

However, a certain limit is placed on the upper limit of the stator flux command by the second block 18*b*. An achievable torque command is calculated by the torque command limit module 13 by using the stator flux command in accordance with Expressions (30) and (36). The achievable torque differs between the field weakening region I and the field weakening region II as described above.

According to the first embodiment above described, operation described below is achieved.

The first block 18a of the appropriate flux command generation module 18 calculates the stator flux command value $\lambda_{s\_opt}$ to be smaller as the power supply angular frequency $\omega_e$ increases.

The second block 18b limits the stator flux command value $\lambda_{s\_opt}$ to a constant value at the rated flux ($\lambda_{rate}$) in a low speed range in which the power supply angular frequency $\omega_e$ is small. However, the second block 18b places no limit in a high speed range in which the power supply angular frequency $\omega_e$ is large. The second block 18b places no limit at least in a speed region equal to or higher than the field weakening starting point. Without the limit by the second block 18b, the stator flux command value $\lambda_{s\_opt}$ is calculated to be smaller as the power supply angular frequency $\omega_e$ increases.

As understood from Expressions (30) and (36), the upper limit torque command value $T_{e\_max}$ is calculated to be smaller as the stator flux command value $\lambda_{s\_opt}$ is smaller. The width between the upper limit torque value ($+T_{e\_max}$) and the lower limit torque value ($-T_{e\_max}$) decreases as the upper limit torque command value $T_{e\_max}$ is smaller.

The torque command limit module 13 can calculate the upper limit torque command value $T_{e\_max}$ to be smaller as the power supply angular frequency $\omega_e$ increases in a somewhat high speed range. When the upper limit torque command value $T_{e\_max}$ is calculated to be smaller, the width between the upper limit torque value ($+T_{e\_max}$) and the lower limit torque value ($-T_{e\_max}$) is set to be smaller.

Through such operation, the torque limiter range can be set to be smaller as the power supply angular frequency $\omega_e$ increases at least in the field weakening regions I and II. An allowable torque range in which the control stability can be maintained tends to be smaller as the power supply angular frequency $\omega_e$ increases. According to the first embodiment, the torque limiter range is dynamically adjusted in accordance with such a tendency.

Torque increase can be performed without degrading the control stability because a torque command value changes only in the torque limiter range adjusted to an appropriate range. Accordingly, when the motor is operated fast in a field weakening region, the control stability and the output torque increase can be simultaneously achieved.

In the first embodiment, Expression (30) of the first block 13a is applied at a speed lower than the boundary speed $\omega_{e\_c}$. The upper limit torque command value $T_{e\_max}$ can be changed at an appropriate tendency in accordance with the second-order polynomial of the stator flux command value $\lambda_{s\_opt}$.

In the first embodiment, Expression (36) of the second block 13b is applied at a speed equal to or higher than the boundary speed $\omega_{e\_c}$. The upper limit torque command value $T_{e\_max}$ can be appropriately changed in accordance with the monomial of the second-order term ($\lambda_{s\_opt}^2$) of the stator flux command value at a tendency different from that of Expression (30).

Accordingly, the upper limit torque command value $T_{e\_max}$ can be changed at an appropriate tendency in each of the field weakening regions I and II.

In the embodiment, the torque command limit module 13 includes the fifth block 13e. With this configuration, the upper limit torque command value $T_{e\_max}$ calculated by the first block 13a and the upper limit torque command value $T_{e\_max}$ calculated by the second block 13b can be selectively switched in accordance with the power supply angular frequency $\omega_e$.

In the first embodiment, the fourth block 13d is provided. With this configuration, the first block 13a, in other words, Expression (30) is applied in both of Region I and the normal operation region. Accordingly, calculation of the upper limit torque command value $T_{e\_max}$ can be seamlessly performed through the normal operation region and the field weakening region.

In the first embodiment, the appropriate flux command generation module 18 includes the second block 18b. When Expression (29) is applied in a low speed range in which the power supply angular frequency $\omega_e$ is small, the stator flux command value $\lambda_{s\_opt}$ is calculated to be excessively large. The second block 18b places an upper limiter to prevent the stator flux command value $\lambda_{s\_opt}$ from being calculated to be excessively large.

Figure 20:
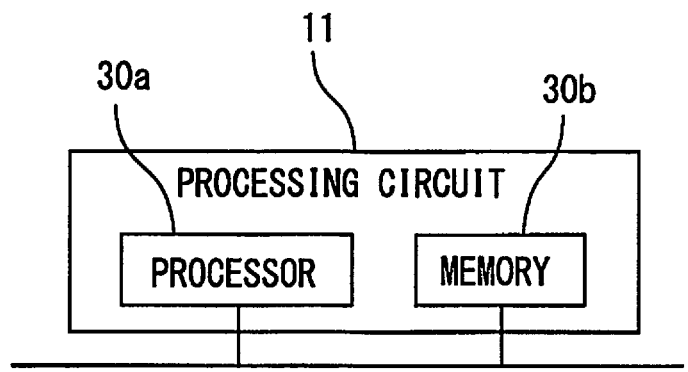
FIG. 20 is a diagram illustrating a hardware configuration applicable to the controller for a power convertor according to the first embodiment.

Next, an example of the controller is described with the use of FIG. 20. FIG. 20 is a hardware configuration diagram of the controller for a power converter according to the embodiment 1 of the present invention. The hardware configuration in FIG. 20 may also be adapted to the second embodiment and the third embodiment described later.

As illustrated in FIG. 20, each function of the controller 9 is executed by the processing circuit. The processing circuit includes a processor 30a and a memory 30b.

For example, the processor 30a is a central processing unit (CPU), e.g., a central processing device, a processing device, a microprocessor, a microcomputer, a processor or a digital signal processor (DSP).

For example, the memory 30b is a non-volatile or volatile semiconductor memory such as RAM, ROM, flash memory, EPROM, EEPROM, or magnetic disk, flexible disk, optical disk, compact disk, mini-disk or DVD.

In the processing circuit, a program stored in the memory 30b is executed by the processor 30a.

Second Embodiment

Configuration of Device According to Second Embodiment

Figure 11:
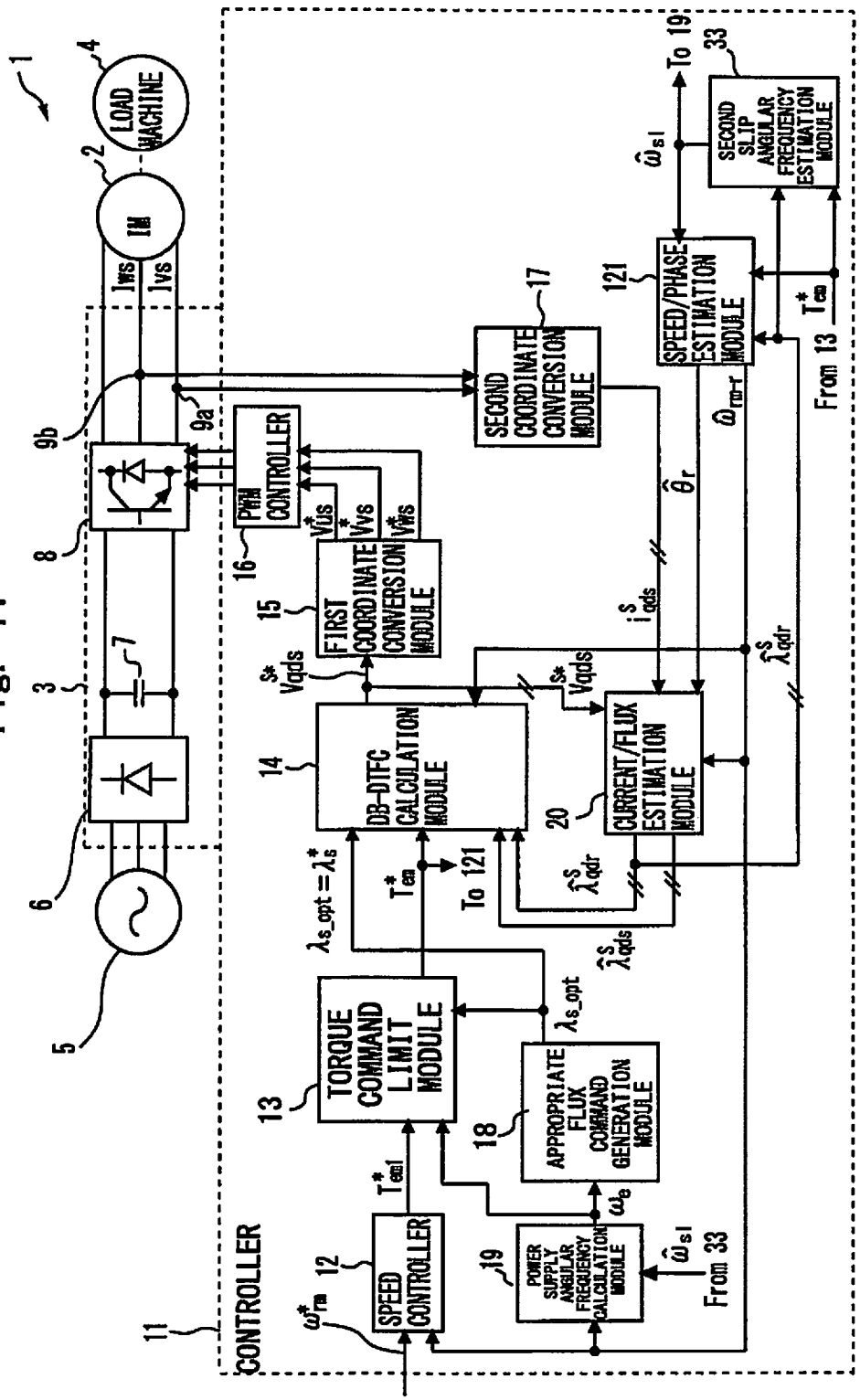
FIG. 11 is a configuration diagram of a motor system to which a controller for a power convertor according to a second embodiment is applied.

FIG. 11 is a configuration diagram of a motor system to which a controller for a power convertor according to a second embodiment is applied. The second embodiment differs from the first embodiment in that a motor system in the second embodiment is a sensor-less system including no speed sensor, whereas the motor system according to the first embodiment is a sensor-equipped system including the speed sensor 119.

In the second embodiment, the speed sensor 119 is omitted, and the speed and phase estimation module 21 is replaced with a speed and phase estimation module 121. In addition, the first slip angular frequency estimation module 32 is replaced by the second slip angular frequency estimation module 33. Any other configuration is the same as that of the first embodiment.

The speed and phase estimation module 121 as a motor speed estimation module calculates the rotor electrical angle estimated value $\hat{\theta}_r$ and the rotor mechanical angular speed estimated value $\hat{\omega}_{rm\_r}$ based on the second torque command value $T_{em}^*$, a slip frequency estimated value $\omega_{sl}$ outputted from the second slip angular frequency estimation module 33, and the rotor dqs-axes flux estimated value $\hat{\lambda}_{qdr}^S$.

The second slip angular frequency estimation module 33 uses the second torque command value $T_{em}^*$ and the rotor dqs-axes flux estimated value $\hat{\lambda}_{qdr}^S$ as input values to calculate the slip angular frequency estimation values $\hat{\omega}_{sl}$ based on Equation (44). The slip angular frequency estimated value $\hat{\omega}_{sl}$ is inputted to the speed/phase estimation module 121 and the power supply angular frequency calculation module 19.

Figure 12:
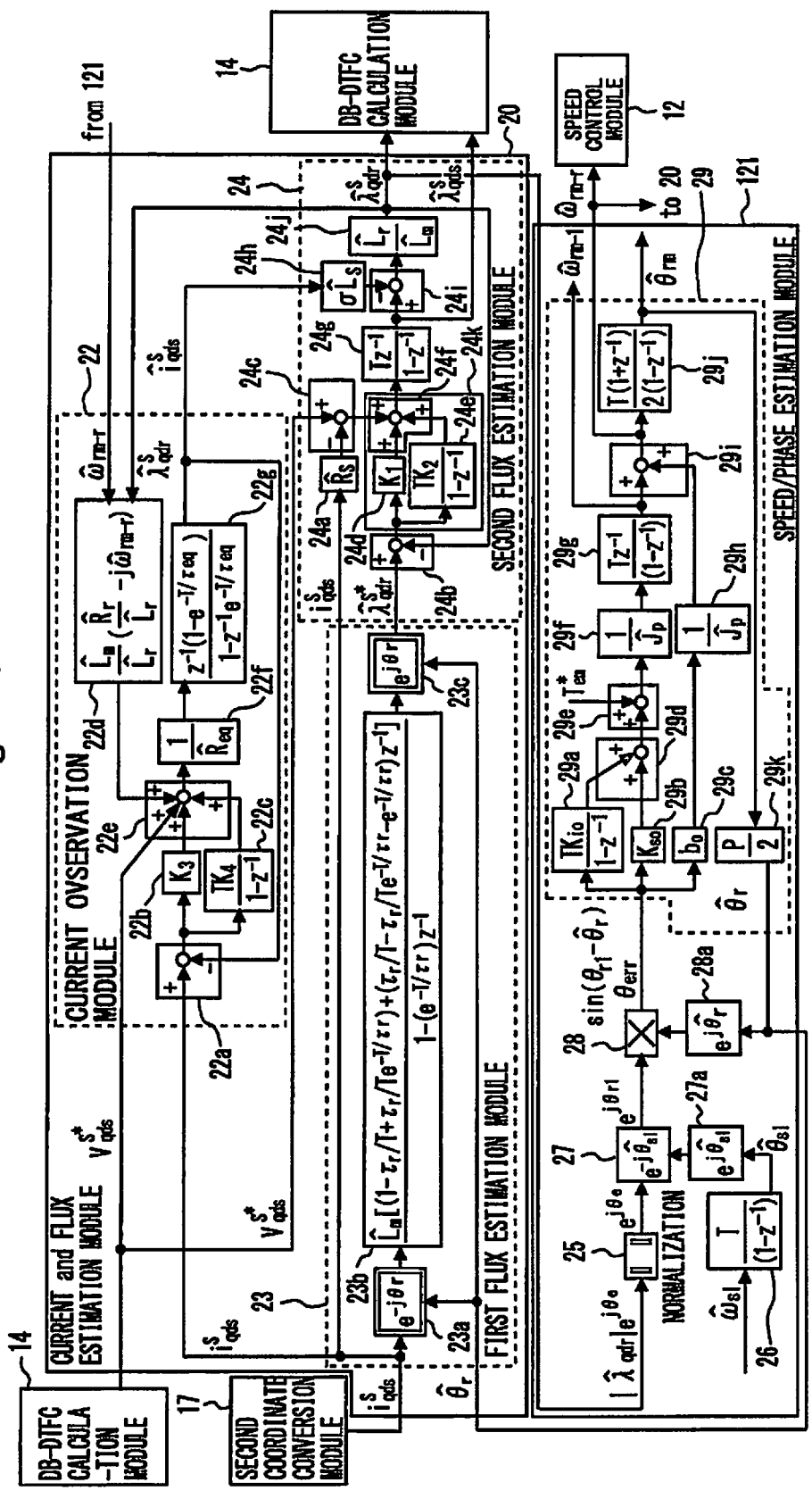
FIG. 12 is an enlarged configuration diagram of part of the controller for a power convertor according to the second embodiment.

FIG. 12 is a block diagram of the main sections of the controller for the power converter according to the embodiment 1 of the present invention. Next, the current/flux estimation module 20 and the speed/phase estimation module 21 will be described with the use of FIG. 12.

As illustrated in FIG. 12, the current/flux estimation module 20 includes a current observation module 22, a first flux estimation module 23 and a second flux estimation module 24.

The current observation module 22 calculates a stator dqs-axes current estimated value $\hat{i}_{qds}^s$ in a subsequent control period based on the voltage command value $V_{qds}^{S*}$, the stator dqs-axes current measured value $i_{qds}^s$, a rotor mechanical angular speed estimated value $\hat{\omega}_{rm-r}$ and a rotor dqs-axes flux estimated value $\lambda_{qdr}^S$.

The stator dqs-axes current measured value $i_{qds}^s$ is the output of the second coordinate conversion module 17. The rotor mechanical angular speed estimated value $\hat{\omega}_{rm-r}$ is an output of the speed/phase estimation module 121. The rotor dqs-axes flux estimated value $\hat{\lambda}_{qdr}^S$ is an output of the second flux estimation module 24. The voltage command value $V_{qds}^{S*}$ is an output from the DB-DTFC calculation module 14.

On this occasion, the proportional gain $K_3$, the integral gain $K_4$, the estimated value $\hat{R}_{eq}$ of the equivalent resistance, the estimated value $\hat{L}_r$ of the rotor winding inductance, the estimated value $\hat{L}_m$ of the magnetizing inductance, the rotor resistance $\hat{R}_r$ and the imaginary number j, the rotor mechanical angular speed estimated value $\hat{\omega}_{rm-r}$, the equivalent time constant $\tau_{eq}$, the control period T and the delay operator $z^{-1}$ are used.

Specifically, the current observation module 22 includes a first block 22a, a second block 22b, a third block 22c, a fourth block 22d, a fifth block 22e, a sixth block 22f, and a seventh block 22g.

The first block 22a calculates a value obtained by subtracting the stator dqs-axes current estimated value $\hat{i}_{qds}^s$ from the stator dqs-axes current measured value $i_{qds}^s$. The stator dqs-axes current estimated value $\hat{i}_{qds}^s$ is the output of the seventh block 22g.

The output of the first block 22a is inputted into the second block 22b and the third block 22c. The second block 22b is a proportional circuit of gain $K_3$. The third block 22c is an integrating circuit of gain $K_4$. The fourth block 22d calculates a complemented value from a rotor mechanical angular speed estimated value $\hat{\omega}_{rm-r}$ and a rotor dqs-axes flux estimated value $\hat{\lambda}_{qdr}^S$. The rotor mechanical angular speed estimated value $\hat{\omega}_{rm-r}$ is an output of the speed/phase estimation module 121. The rotor dqs-axes flux estimated value $\hat{\lambda}_{qdr}^S$ is an output of the second flux estimation module 24.

The fourth block 22d calculates a value obtained by multiplying the rotor dqs-axes flux estimated value $\hat{\lambda}_{qdr}^S$ by the transfer coefficient G1 expressed by the following Expression (37).

$$G1 = \frac{\hat{L}_m}{\hat{L}_r}\left(\frac{\hat{R}_r}{\hat{L}_r} - j\hat{\omega}_{rm-r}\right) \tag{37}$$

The fifth block 22e calculates a value obtained by adding the voltage command value $V_{qds}^{S*}$, the value calculated by the second block 22b, the value calculated by the third block 22c, the value calculated by the fourth block 22d.

The sixth block 22f calculates a value obtained by dividing the value calculated by the fifth block 22e by the estimated value $\hat{R}_{eq}$ of the equivalent resistance.

The output of the sixth block 22f is input into the seventh block 22g. The seventh block 22g calculates a transfer function expressed in the Expression (38). The seventh block 22g outputs a stator dqs-axes current estimated value $\hat{i}_{qds}$.

$$G2 = \frac{z^{-1}(1 - e^{-T/\tau_{eq}})}{1 - z^{-1}e^{-T/\tau_{eq}}} \tag{38}$$

The stator dqs-axes current estimated value $\hat{i}_{qds}^s$ is input into the first block 22a and the second flux estimation module 24.

The first flux estimation module 23 calculates a rotor dqs-axes flux estimated value $\lambda_{qdr}^{S*}$ based on the rotor electrical angle estimated value $\hat{\theta}_r$ and the stator dqs-axes current measured value $i_{qds}^s$. The rotor electrical angle estimated value $\hat{\theta}_r$ is an output of the speed/phase estimation module 121. The stator dqs-axes current measured value $i_{qds}^s$ is an output of the second coordinate conversion module 17.

On this occasion, the estimated value $\hat{L}_m$ of the magnetizing inductance of the motor 2, the rotor time constant $\tau_r$ of the motor 2, the control period T and the delay operator $z^{-1}$ are used.

Specifically, the first flux estimation module 23 includes a first block 23a, a second block 23b, and a third block 23c.

The first block 23a converts the stator dqs-axes current measured value $i_{qds}^s$ to the value of the rotor coordinate system by the rotor electrical angle estimated value $\hat{\theta}_r$.

The output of the first block 23a is the input of the second block 23b.

The second block 23b multiplies the value calculated by the first block 23a by the transfer function G3 expressed by the following Expression (39) to calculate the stator dqs-axes flux estimated value of the primary hold.

$$G3 = \frac{\hat{L}_m\left|(1 - \tau_r/T + \tau_r/Te^{-T/\tau_r}) + \left(\frac{\tau_r}{T} - \tau_r/Te^{-T/\tau_r} - e^{-T/\tau_r}\right)z^{-1}\right|}{1 - (e^{-T/\tau_r})z^{-1}} \tag{39}$$

The output of the second block 23b is the input of the third block 23c.

The third block 23c converts the output of the second block 23b to the value of the rotor coordinate system by the rotor electrical angle estimated value $\hat{\theta}_r$. The output of the second block 23b is the rotor dqs-axes flux estimated value $\hat{\lambda}_{qdr}^{S*}$. The rotor dqs-axes flux estimated value $\lambda_{qdr}^{S*}$ is inputted into second flux estimation module 24.

The second flux estimation module 24 calculates a stator dqs-axes flux estimated value $\hat{\lambda}_{qds}^S$ and a rotor dqs-axes flux estimated value $\hat{\lambda}_{qdr}^S$ in a subsequent control period based on the voltage command value $V_{qds}^{S*}$ outputted from the DB-DTFC calculation module 14, the stator dqs-axes current measured value $i_{qds}^s$ output of the second coordinate conversion module 17, the stator dqs-axes current estimated value $\hat{i}_{qds}^s$ estimated by the current observation module 22, the rotor dqs-axes flux estimated value $\hat{\lambda}_{qdr}^{S}*$ estimated by the first flux estimation module 23.

On this occasion, the proportional gain $K_1$, the integral gain $K_2$, the estimated value $\hat{R}_s$ of the stator resistance, the leakage factor σ, the estimated value $\hat{L}_r$ of the rotor winding inductance, the estimated value of $\hat{L}_s$ of the stator winding inductance, the estimated value $\hat{L}_m$ of the magnetizing inductance, the control period T and the delay operator $z^{-1}$ are used.

Specifically, the second flux estimation module 24 includes a first block 24a, a second block 24b, a third block 24c, a fourth block 24d, a fifth block 24e, a sixth block 24f, a seventh block 24g, and an eighth block 24h, a ninth block 24i, and a tenth block 24j.

The first block 24a calculates a value of the voltage drop by multiplying the stator dqs-axes current measured value $i_{qds}^{s}$ by the estimated value $\hat{R}_s$ of the stator resistance.

The second block 24b subtracts the rotor dqs-axes flux estimated value $\hat{\lambda}_{qdr}^{S}$ which is the output of the tenth block 24j from the rotor dqs-axes flux estimated value $\hat{\lambda}_{qdr}^{S}*$.

The third block 24c calculates a value obtained by subtracting the value calculated by the first block 24a from the voltage command value $V_{qds}^{S}*$.

The fourth block 24d, the fifth block 24e, and the sixth block 24f function as a transition frequency determination unit 24k. The transition frequency determining unit 24k determines the transition frequency between the first flux estimation module 23 and the second flux estimation module 24.

Specifically, the fourth block 24d calculates a value obtained by multiplying the value calculated by the second block 24b by the proportional gain $K_1$.

The fifth block 24e is an integrating circuit of gain $K_2$. The fifth block 24e calculates an integral of the output of the fourth block 24d.

The sixth block 24f calculates a value of the input voltage of the motor 2 by adding the value calculated by the third block 24c, the value calculated by the fourth block 24d and the value calculated by the fifth block 24e.

The seventh block 24g calculates the stator dqs-axes flux estimated value $\hat{\lambda}_{qds}^{S}$ by integrating the output of the sixth block 24f.

The eighth block 24h calculates a value obtained by multiplying the stator dqs-axes current estimated value $\hat{i}_{qds}^{s}$ by the factor G4 expressed by the following Expression (40).

$$G4 = \sigma \hat{L}_s \qquad (40)$$

The ninth block 24i calculates a value obtained by subtracting the value calculated by the eighth block 24h from the stator dqs-axes flux estimated value $\hat{\lambda}_{qds}^{S}$ calculated by the seventh block 24g.

The tenth block 24j multiplies the value calculated by the ninth block 24i by the factor G5 expressed by the following Expression (41) to calculate the rotor dqs-axes flux estimated value $\hat{\lambda}_{qdr}^{S}$.

$$G5 = \frac{\hat{L}_r}{\hat{L}_m} \qquad (41)$$

For example, in the case where the frequency of the rotor flux of the motor 2 is lower than the transition frequency, the first flux estimation module 23 is dominant. For example, in the case where the frequency of the rotor flux of the motor 2 is higher than the transition frequency, the second flux estimation module 24 is dominant. As a result, the rotor dqs-axes flux estimated value is accurately calculated.

The speed/phase estimation module 21 includes a phase estimation module 25, a slip angle estimation module 26, a flux vector rotation module 27, a phase error estimation module 28 and a speed and position observing module 29.

The phase estimation module 25 calculates an estimated value $e^{j\theta_e}$ of a phase of the flux vector of the motor 2 from the rotor dqs-axes flux estimated value $\hat{\lambda}_{qdr}^{S}$ calculated by the current/flux estimation module 20. For example, the phase of flux vector can be the phase of the stator flux vector calculated by the current/flux estimation module 20. The rotor dqs-axes flux estimated value $\hat{\lambda}_{qdr}^{S}$ which is the output of the current/flux estimation module 20 is input into the phase estimation module 25.

In particular, the phase estimation module 25 calculates an estimated value $e^{j\theta_e}$ of a phase of the stator flux vector of the motor 2 by the following Expression (42).

$$e^{j\theta_e} = \cos\theta_e + j\sin\theta_e = \frac{\hat{\lambda}_{q*}^{s}}{|\hat{\lambda}_{qd*}^{s}|} + \frac{\hat{\lambda}_{d*}^{s}}{|\hat{\lambda}_{qd*}^{s}|} \qquad (42)$$

Although the power phase can be calculated by using any one of the stator flux $\hat{\lambda}_{qds}$ and the rotor flux $\hat{\lambda}_{qdr}$ in the Expression (42), the stator flux is used for the estimation in the first embodiment. In the Expression (42), the suffix "*", i.e. an asterisk, is "s" when a calculation is done using the stator flux $\hat{\lambda}_{qds}$. On the other hand, in the Expression (42), the suffix "*" is "r" when a calculation is done using the rotor flux $\hat{\lambda}_{qdr}$.

An estimated value $\hat{\omega}_{sl}$ of a slip frequency of the motor 2 is calculated by the second slip angular frequency estimation module 33. The estimated value $\hat{\omega}_{sl}$ of the slip frequency is inputted to the slip angle estimation module 26.

The slip angle estimation module 26 calculates a slip angle estimated value $\hat{\theta}_{sl}$. The slip angle estimated value $\hat{\theta}_{sl}$ is calculated by integrating the estimated value $\hat{\omega}_{sl}$ of the slip frequency. The sine and cosine of the slip angle estimated value $\hat{\theta}_{sl}$ is calculated by the sine/cosine calculation unit 27a and is inputted to the flux vector rotation module 27.

The flux vector rotation module 27 calculates a first rotor electrical angle estimated value $\hat{\theta}_{r1}$ based on the estimated value $e^{j\theta_e}$ of the phase of the flux vector calculated by the phase estimation module 25 and the output of the sine/cosine calculation module 27a.

The sine and cosine of the rotor electric angle estimated value $\hat{\theta}_r$ is calculated by the sine/cosine calculation unit 28a. The calculated values of the sine and cosine of the rotor electric angle estimated value $\hat{\theta}_r$ are inputted to the phase error estimation module 28.

The phase error estimation module 28 performs additive theorem operation by using the two rotor electrical angles calculated by the flux vector rotation module 27 and the speed and position observing module 29. The estimated value $\hat{\theta}_{err}$ of rotor electrical angle error is calculated by using approximation of sin Δθ≈Δθ when Δθ is minute.

The speed and position observing module 29 calculates rotor mechanical angular estimated values $\hat{\omega}_{rm-r}$ and $\hat{\omega}_{rm-r}$, a mechanical angle estimated value $\hat{\theta}_{rm}$, electrical angle estimated value $\hat{\theta}_r$ based on the estimated value $\hat{\theta}_{err}$ calculated by phase error estimation module 28.

Specifically, the speed and position observing module 29 includes a first block 29a, a second block 29b, a third block 29c, a fourth block 29d, a fifth block 29e, a seventh block 29f, an eighth block 29g, and a ninth block 29h and a tenth block 29i.

The first block 29a is an integrating circuit of gain $K_{io}$. The first block 29a calculates an integral of the estimated value $\hat{\theta}_{err}$ calculated by phase error estimation module 28. The second block 29b corrects the estimated value $\hat{\theta}_{err}$ estimated by the phase error estimation module 28 by multiplying the estimated value $\hat{\theta}_{err}$ estimated by the phase error estimation module 28 and the gain $K_{so}$.

The third block 29c multiples the estimated value $\hat{\theta}_{err}$ estimated by the phase error estimation module 28 and the gain $b_o$.

The fourth block 29d calculates a value obtained by adding the value calculated by the first block 29a and the value calculated by the second block 29b.

The fifth block 29e calculates a value obtained by adding the value calculated by the fourth block 28d and the torque command value $T_{em}^*$, and outputs the calculated value to the sixth block 29f. The sixth block 29f divides the input value by the estimated value $\hat{J}_p$ of moment of inertia and outputs it to the seventh block 29g.

The seventh block 29g calculates a rotor mechanical angular speed estimated value $\hat{\omega}_{rm-1}$. The seventh block 29g is an integrating circuit. The seventh block 29g calculates an integral of the output of the sixth block 29f.

The eighth block 29h calculates the speed correction value by dividing the value calculated by the third block 29c by the estimated value $\hat{J}_p$ of the moment of inertia.

The ninth block 29i calculates a rotor mechanical angular speed estimated value $\hat{\omega}_{rm-r}$ by adding the rotor mechanical angular speed estimated value $\hat{\omega}_{rm-1}$ calculated by the seventh block 29g and the speed correction value obtained by the eighth block 29h.

The tenth block 29j calculates a rotor mechanical angle estimated value $\hat{\theta}_{rm}$. The tenth block 29j is an integrating circuit. The seventh block 29g calculates an integral of the rotor mechanical angular speed estimated value $\hat{\omega}_{rm-r}$ The eleventh block 29k calculates the rotor electrical angle estimated value $\hat{\theta}_r$ by dividing the value obtained by multiplying the rotor mechanical angle estimated value $\hat{\theta}_{rm}$ calculated by the tenth block 29j by the number of poles P of the motor 2 by 2.

Operation of Device According to Second Embodiment

1. Field Weakening Region Increase in Self-Sensing

The system according to the second embodiment is a sensor-less system including no speed sensor, and has a self-estimation function of estimating, for example, a speed by using various parameters in the system. The self-estimation function is also referred to as "self-sensing".

As described above in the first embodiment, the output torque can be increased by selecting a combination of stator flux command vectors in a field weakening region. This allows fast operation when the load torque is large, and accordingly, leads to increase of the field weakening region. The present section describes discussions related to the field weakening region increase by the self-sensing.

In the system according to the second embodiment illustrated in FIGS. 11 and 12, a flux observer is constituted by the first flux estimation module 23 and the second flux estimation module 24. The speed and phase estimation module 121 performs speed estimation by using a flux observer function of the current and flux estimation module 20. This speed estimation using the flux observer function can be performed by using one of a stator flux estimated value and a rotor flux estimated value.

In addition, a slip angular frequency is input to the speed and phase estimation module 121. Estimation of the slipping angular frequency can be performed by using one of the stator flux estimated value and the rotor flux estimated value. Thus, either the stator flux estimated value or the rotor flux estimated value can be optionally selected as an input value used in the speed estimation and the slipping angular frequency estimation.

The speed and position observation module 29 in the speed and phase estimation module 121 illustrated in FIG. 12 is equivalent to the motion observer.

The slipping angular frequency calculated based on the stator flux is expressed by Expression (43). The slipping angular frequency calculated based on the rotor flux is expressed by Expression (44).

When the power supply phase $e^{j\theta_e}$ is estimated by using the stator flux, the slip calculation is performed by the Expression (43). On the other hand, when power supply phase $e^{j\theta_e}$ is estimated by using the rotor flux, the slip calculation is performed by the Expression (44). One of $\hat{\omega}_{sl-s}$ and $\hat{\omega}_{sl-r}$ is eventually used, and the eventually used value is expressed as $\hat{\omega}_{sl}$.

It should be noted that, in the Expression (43), a superscript symbol "es" of each sign represents a synchronous coordinate system developed with the stator flux as a reference. The stator flux value $\lambda_{qs}^s$ of the stationary coordinate system is a sine wave signal, and the development is done based on the stator flux as a reference.

In the synchronous coordinate system, the origin of the coordinate system is reset in each control cycle so as to ensure $\lambda_{qs}^{es}=0$. Thereby, other signals are also converted accordingly. The advantageous effect of this coordinate transformation is that specific calculations can be easier.

$$\hat{\omega}_{sl\_s} = \frac{L_s\left[i_{qs}^{es} + \sigma\tau_r\frac{di_{qs}^{es}}{dt}\right]}{\tau_r(\lambda_{ds}^{es} - \sigma L_s i_{ds}^{es})} \quad (43)$$

$$\hat{\omega}_{sl\_r} = \frac{4}{3P}\frac{T_{em}^*}{|\lambda_{qdr}^s|^2}R_r \quad (44)$$

2. Low Pass Filter Effect

The rotor flux has less noise than the stator flux. This is because the rotor flux is less affected by a high frequency component included in voltage due to PWM. This will be described below by using Expression (45) as a stator flux equation and Expression (46) as a rotor flux equation.

$$p\lambda_{qds}^s = V_{qds}^s - \frac{R_s}{\sigma L_s}\lambda_{qds}^s + \frac{R_s L_m}{\sigma L_s L_r}\lambda_{qdr}^s \quad (45)$$

$$p\lambda_{qdr}^s = \frac{R_r L_m}{\sigma L_s L_r}\lambda_{qds}^s - \left(\frac{R_r}{\sigma L_r} - j\omega_r\right)\lambda_{qdr}^s \quad (46)$$

The stator flux receives an input of voltage as indicated in Expression (45). Thus, the stator flux is directly affected by a high frequency component of voltage due to PWM. However, this influence on the rotor flux is reduced by a filter. This filter effect will be described below.

Expression (46) is provided with Laplace transform and rewritten by replacing coefficients of the stator flux and the rotor flux on the right hand side with A and B, respectively.

$$p\lambda_{qdr}^s = A\lambda_{qds}^s - B\lambda_{qdr}^s$$

$$\lambda_{qdr}^s = \frac{1}{s}(A\lambda_{qds}^s - B\lambda_{qdr}^s)$$

$$\left(1 + \frac{B}{s}\right)\lambda_{qdr}^s = \frac{A}{s}\lambda_{qds}^s$$

$$\lambda_{qdr}^s = \frac{s}{s+B}\frac{A}{s}\lambda_{qds}^s$$

Finally, Expression (47) below is derived.

$$\lambda_{qdr}^s = \frac{A}{s+B}\lambda_{qds}^s \qquad (47)$$

As understood from Expression (47), the rotor flux is equivalent to flux obtained by applying a low pass filter to the stator flux. The rotor flux is a value obtained based on the stator flux, and the stator flux is affected by a high frequency component of voltage. However, influence of voltage noise on the rotor flux is reduced by the above-described low pass filter effect.

When the flux amplitude is reduced by field weakening, the S/N ratio degrades. Additionally, in self-sensing in which the stator flux is used in phase estimation, control is likely to be unstable as compared to a case in which the rotor flux is used. This is because the stator flux is directly affected by a high frequency component of voltage.

The above-described low pass filter effect is achieved by the eighth block 24h, the ninth block 24i, and the tenth block 24j, in particular, among the blocks of the second flux estimation module 24 illustrated in FIG. 12.

4. Test Results

Figure 13:
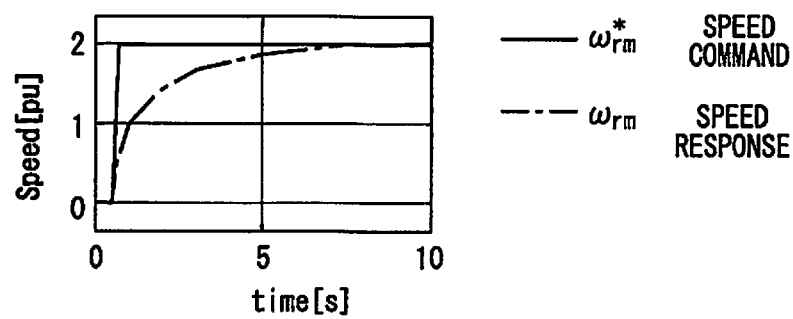
FIG. 13 is a diagram showing an example of a result of field weakening test in the second embodiment.
Figure 14:
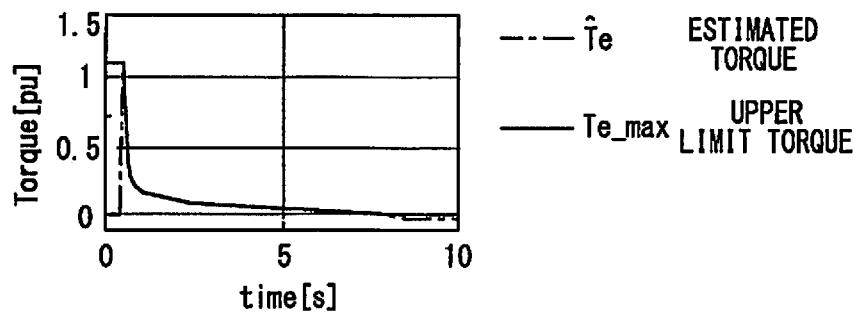
FIG. 14 is a diagram showing an example of a result of field weakening test in the second embodiment.
Figure 15:
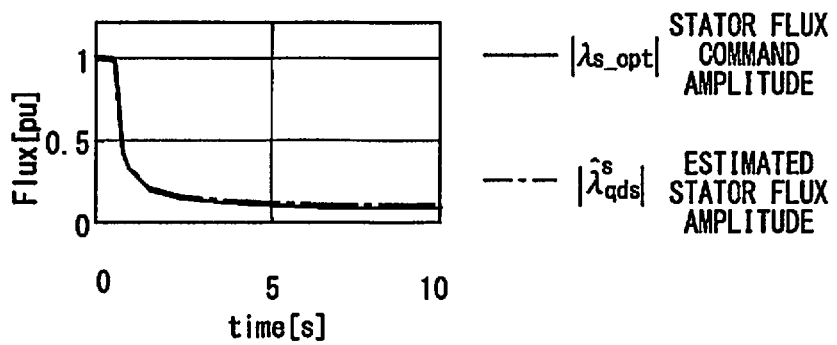
FIG. 15 is a diagram showing an example of a result of field weakening test in the second embodiment.

FIGS. 13 to 15 are diagrams showing an example of the test results of field weakening in the second embodiment. The response when the speed command is increased from 0.1 pu to 2.0 pu is shown. In both figures, the horizontal axis is the time axis.

The vertical axis in FIG. 12 represents the angular speed command value $\omega_{rm}^*$ of the motor 2 and the measured speed value $\overline{\omega}_{rm}$. The vertical axis in FIG. 14 represents the estimated torque of the motor 2 and the torque limit value. The vertical axis in FIG. 15 represents the amplitude of the stator flux command value and the estimated stator flux amplitude.

The estimated torque is calculated by multiplying the stator flux estimated value and the rotor flux estimated value. As shown in FIG. 13, the motor 2 is stably accelerated to a speed of 2.0 PU. According to FIG. 14, the estimated torque of the motor 2 is equal to the torque limit value during acceleration, but when the acceleration is completed, the estimated torque of the motor 2 is smaller than the torque limit value.

This performance depends on a bandwidth obtained by internal proportional integral gain of each observer. Suppressing the bandwidth at relatively low level makes it possible that a high frequency band noise component is not included in the estimated speed.

In the field weakening operation, it is preferable to set the bandwidth of the speed and phase estimation module 121 to be relatively low to reduce noise included in the estimated speed. A speed (phase) for self-sensing can be calculated from various waveforms of current, voltage, and flux, for example.

The second embodiment above described includes at least two characteristic configurations.

The first characteristic configuration is the speed and phase estimation module 121. This configuration achieves a sensor-less system equivalent to the system according to the first embodiment. The sensor-less configuration provides a technological advantage such as the torque limit adjustment in a field weakening region achieved according to the first embodiment, and allows any speed sensor to be omitted.

The second characteristic configuration is the usage of the rotor dqs-axes flux estimated value $\hat{\lambda}_{qdr}^S$ as an input value to the speed and phase estimation module 121. The speed and phase estimation module 121 calculates an estimated value of a speed of the motor in a subsequent control period based on the rotor dqs-axes flux estimated value $\hat{\lambda}_{qdr}^S$.

A rotor flux estimated value contains less noise than a stator flux estimated value, which leads to highly accurate calculation of the estimated speed value. As a result, the effect of increasing a field weakening region can be achieved in the self-sensing of the sensor-less system.

Modification of Second Embodiment

Figure 16:
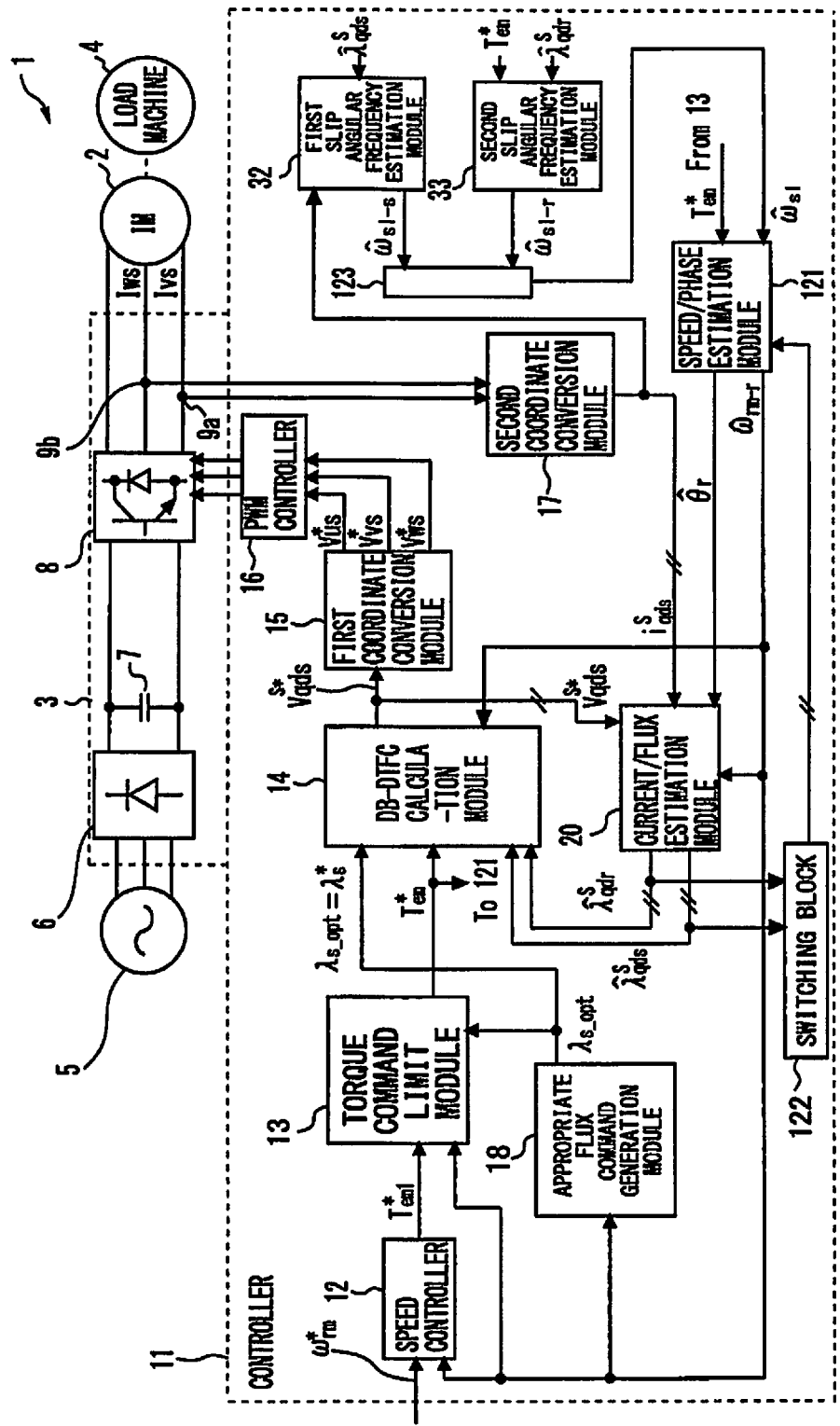
FIG. 16 is a configuration diagram of a motor system to which a controller for a power convertor according to a modification of the second embodiment is applied.

FIG. 16 is a configuration diagram of a motor system to which a controller for a power convertor according to a modification of the second embodiment is applied. In the modification illustrated in FIG. 16, a switching block 122 is provided between the speed and phase estimation module 121 and the current and flux estimation module 20. In the modification shown in FIG. 16, the first slip angular frequency estimation module 32, the second slip angular frequency estimation module 33, and a switching block 123 connected thereto are provided.

The stator dqs-axes flux estimated value $\hat{\lambda}_{qds}^S$ outputted from the current and flux estimation module 20 and the stator dqs-axes current measured value $i_{qds}^s$ outputted from the second coordinate conversion module 17 are inputted to the first slip angular frequency estimation module 32. The first slip angular frequency estimation module 32 performs a calculation based on Expression (43) by using the above inputted values to calculate the slip angular frequency estimated value $\hat{\omega}_{sl\_s}$.

The second torque command value $T_{em}^*$ and the rotor dqs-axes flux estimated value $\hat{\lambda}_{qdr}^S$ are inputted to the second slip angular frequency estimation module 33.

The second slip angular frequency estimation module 33 performs a calculation based on Expression (44) by using the above inputted values to calculate the slip angular frequency estimated value $\hat{\omega}_{sl\_r}$.

The switching block 122 selectively transmits one of the estimated value selected from the rotor dqs-axes flux estimated value $\hat{\lambda}_{qdr}^S$ and the stator dqs-axes flux estimated value $\hat{\lambda}_{qds}^S$ to the speed and phase estimation module 121.

The switching block 123 selectively transmits one of the estimated value selected from the slip angular frequency estimated value $\hat{\omega}_{sl\_s}$ outputted from the first slip angular frequency estimation module 32 and the slip angular frequency estimated value $\hat{\omega}_{sl\_r}$ outputted from the second slip angular frequency estimation module 33 to the speed and phase estimation module 121.

The switching block 122 works together with the switching block 123.

When the switching block 122 selects the rotor dqs-axes flux estimated value $\hat{\lambda}_{qdr}^S$, the switching block 123 selects the slip angular frequency estimated value $\hat{\omega}_{sl\_r}$ outputted from the second slip angular frequency estimation module 33.

On the other hand, when the switching block 122 selects the stator dqs-axes flux estimated value $\hat{\lambda}_{qds}{}^S$, the switching block 123 selects the slip angular frequency estimated value $\hat{\omega}_{sl\_s}$ outputted from the first slip angular frequency estimation module 32.

The criterion by which the switching block 122 and the switching block 123 switch the above estimated values may be predetermined.

For example, the rotor dqs-axes flux estimated value $\hat{\lambda}_{qdr}{}^S$ may be selected if the power supply angular frequency $\omega_e$ is equal to or higher than a predetermined value. For example, the stator dqs-axes flux estimated value $\hat{\lambda}_{qds}{}^S$ may be selected if the power supply angular frequency $\omega_e$ is lower than the predetermined value.

Figure 17:
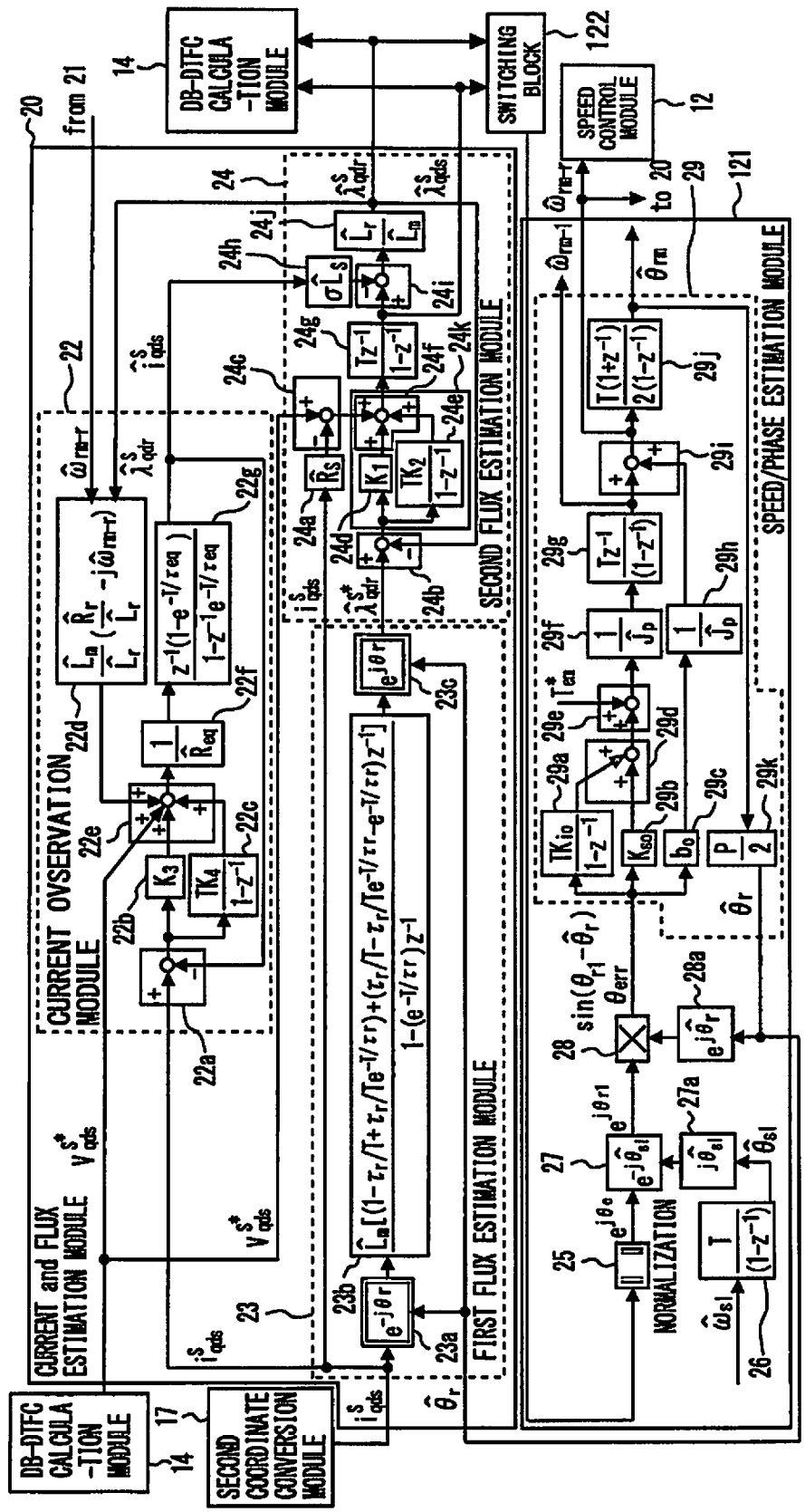
FIG. 17 is an enlarged configuration diagram of part of the controller for a power convertor according to the modification of the second embodiment.

FIG. 17 is a configuration diagram of the controller for a power convertor according to the modification of the second embodiment. The configuration illustrated in FIG. 17 does not include the above-described second characteristic configuration included in the second embodiment. Accordingly, in the modification illustrated in FIG. 17, the stator dq-axis flux estimated value $\hat{\lambda}_{qds}{}^S$ is an input value to the speed and phase estimation module 121.

The modification illustrated in FIG. 17 cannot provide the above-described effects of "improvement of calculation accuracy of the estimated speed value and sensor-less field weakening region increase by the use of the rotor flux". However, even though those effects are not obtained, the modification illustrated in FIG. 17 has advantages of "torque increasing same as that of the first embodiment" and "no need to provide a speed sensor in a sensor-less system".

The controller 11 according to the second embodiment may be achieved by using the structure illustrated in the hardware configuration diagram in FIG. 20.

Figure 21:
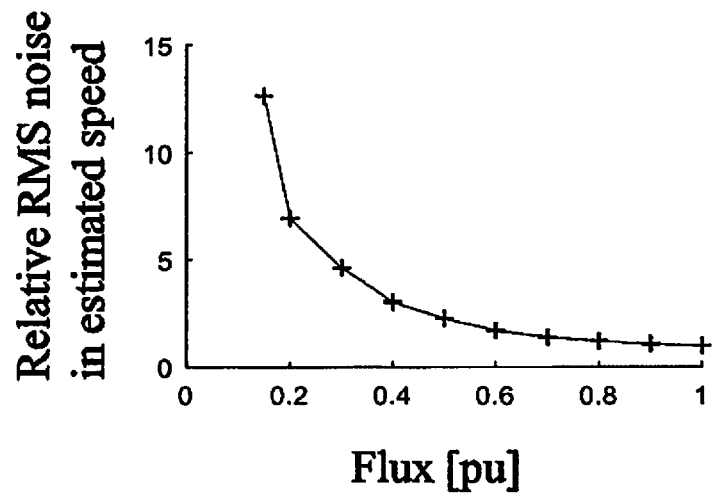
FIG. 21 is a graph of relative RMS noise as flux decreases.

FIG. 21 is a graph of relative RMS noise as flux decreases. As illustrated in FIG. 21, relative RMS error included in the estimated speed increases as the flux decreases. This is because that the flux amplitude decreases as the rotor speed increases while the amplitudes of a PWM harmonic wave and a noise of current measurements are constant.

The noise is normalized to 1 when the flux is 1 pu. The noise increases to 13 approximately when the flux becomes near 0.1 pu.

The formula of the noise is rms ($\hat{\omega}_r - \hat{\omega}_{avg}$). In the formula, $\hat{\omega}_r$ represents an instantaneous speed at each sampling point, and $\hat{\omega}_{avg}$ represents an average speed between sampling points.

It is preferable to reduce influence of noise at low amplitude flux (that is, in a high speed range). To achieve this, it is preferable to set controller gains bo, Kso, and Kio to be low when rotor flux base speed estimation is performed by the speed and phase estimation modules 21, 121 illustrated in FIGS. 3, 12 and 17.

In FIGS. 12 and 17, the controller gain bo is the gain of a third block 29c. The controller gain Kso is the gain of a second block 29b. The controller gain Kio is the gain of a first block 29a. The controller gains bo, Kso, and Kio achieve a function as a filter.

Decrease of the controller gains bo, Kso, and Kio is equivalent to decrease of the cutoff frequency of the filter. Accordingly, noise in a high frequency component included in a rotor flux input of an observer can be reduced.

Third Embodiment

Figure 18:
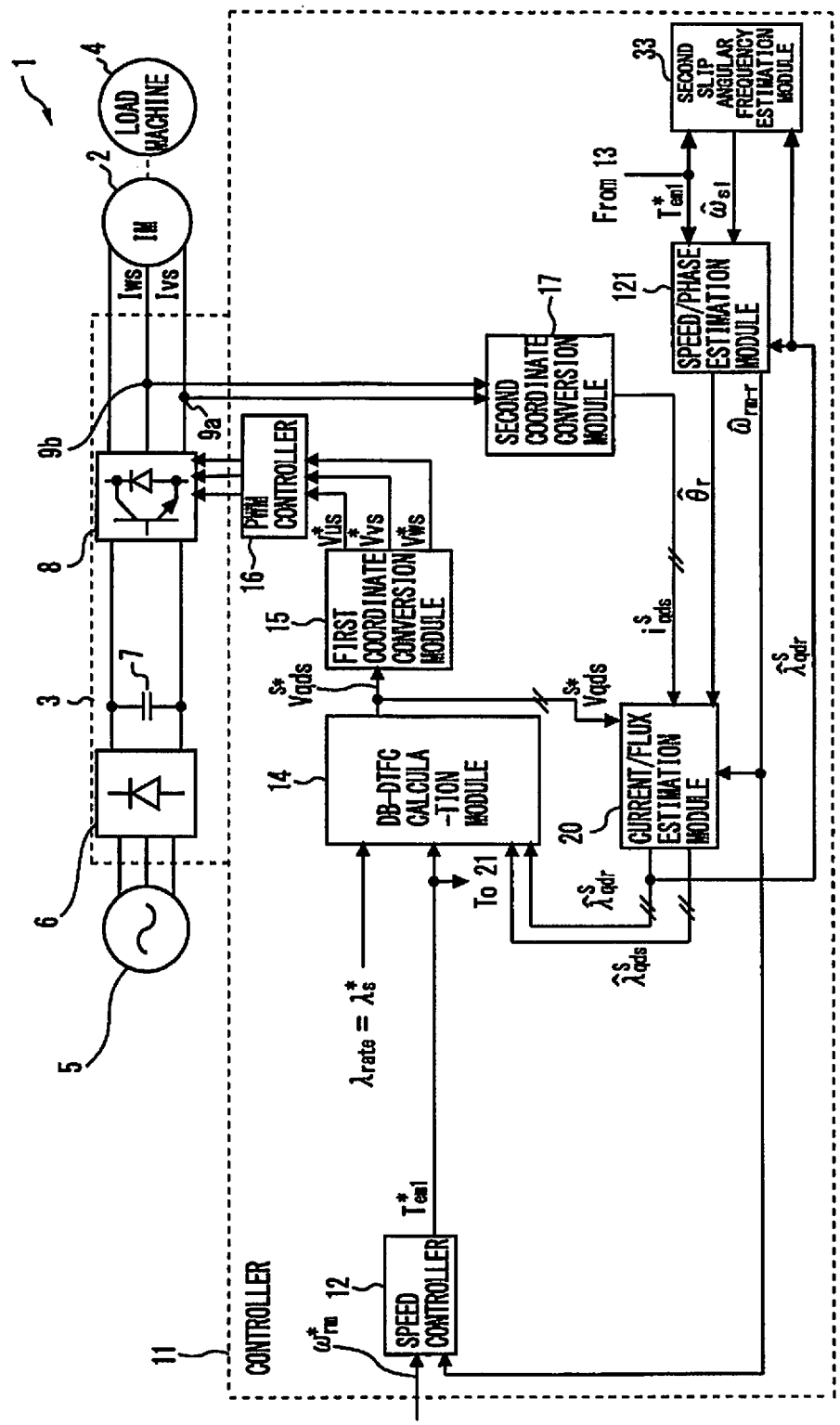
FIG. 18 is a configuration diagram of a motor system to which a controller for a power convertor according to a third embodiment is applied.

FIG. 18 is a configuration diagram of a motor system to which a controller for a power convertor according to a third embodiment is applied.

The torque command limit module 13, the appropriate flux command generation module 18, and the power supply angular frequency calculation module 19, which are provided in the first and second embodiments, are omitted in the motor system according to the third embodiment. Any other configuration is the same as that of the second embodiment.

A value input to the DB-DTFC calculation module 14 is changed due to the configuration omission. In place of the second torque command value $T_{em}*$, the first torque command value $T_{em1}*$ calculated by the speed control module 12 is input to the DB-DTFC calculation module 14. In place of the stator flux command value $\lambda_{s\_opt}$ generated by the appropriate flux command generation module 18, the rated stator flux $\lambda_{rate}$ is input to the DB-DTFC calculation module 14.

Since the torque command limit module 13 and the like are omitted, the advantage of "operation at high power in a wider frequency range", which is achieved in the first embodiment, is restricted in the third embodiment as compared with the first embodiment.

However, similarly to the second embodiment, the speed and phase estimation module 121 is provided and an input value to the speed and phase estimation module 121 is the rotor dqs-axes flux estimated value $\hat{\lambda}_{qdr}{}^S$ in the third embodiment. Thus, the effects of "improvement of calculation accuracy of the estimated speed value and sensor-less field weakening region increase by the use of the rotor flux", which are the same as those of the second embodiment, can be obtained in the third embodiment.

Modification of Third Embodiment

Figure 19:
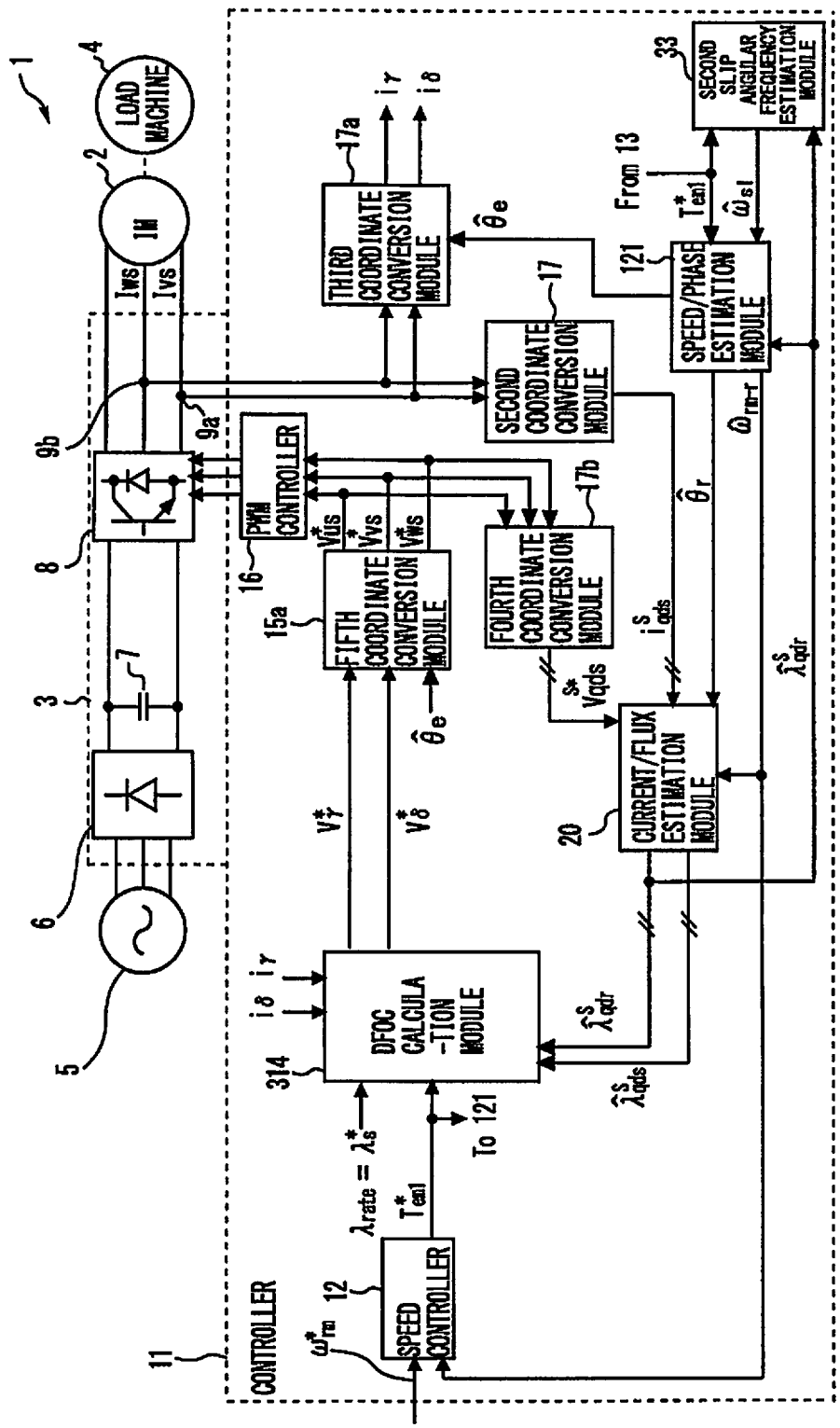
FIG. 19 is a configuration diagram of a motor system to which a controller for a power convertor according to a modification of the third embodiment is applied.

FIG. 19 is a configuration diagram of a motor system to which a controller for a power convertor according to a modification of the third embodiment is applied.

The configuration shown in FIG. 18 is configured with the dead-beat direct torque & flux control (DB-DTFC) method which does not use a PI current controller to generate a voltage command.

However, the configuration in the third embodiment can be implemented not only in the DB-DTFC method but also in a Field Oriented Control method. Field Oriented Control method is also referred to as FOC method hereinafter.

The FOC method is a method in which a current component for generating a torque (rotational force) and a current component for generating a flux are separated from each other, and each current component is independently controlled as a direct current amount.

One of FOC methods is DFOC (Direct Field Oriented Control) method. DFOC method is a method of directly estimating and controlling the flux vector by a flux sensor or a flux observer. FIG. 19 illustrates a configuration diagram of a motor system to which a controller, which is configured based on DFOC method, for a power convertor according to a modification of the third embodiment is applied.

Another one of the FOC methods is IFOC (Indirect Field Oriented Control) method. The IFOC method uses indirect type vector control (also called slip frequency type vector control) that controls a slip of an induction machine regardless of flux estimation or flux detection.

In the modification shown in FIG. 19, DB-DTFC calculation module 14 is replaced with a DFOC calculation module 314, and the first coordinate conversion module 15 is replaced with a fifth coordinate conversion module 15a.

The controller 11 includes a third coordinate conversion module 17a and a fourth coordinate conversion module 17b.

The v-phase stator current $I_{vs}$ and the w-phase stator current $I_{ws}$ are inputted to the third coordinate conversion module 17a.

The three phase stator voltage command value $V_{us}*$, $V_{vs}*$, and $V_{ws}*$, which is outputted from the fifth coordinate conversion module 15a, is inputted to the fourth coordinate conversion module 17b.

The first torque command value $T_{em1}*$ calculated by the speed control module 12 is inputted to the DFOC calculation module 314 in the system according to DFOC method shown in FIG. 19.

With respect to a flux command, although the rated flux value $\lambda_{rate}$ is inputted to the DFOC calculation module 314 as the stator flux command value $\lambda_s*$, other system based on DFOC method may perform a control based on the rotor flux command value $\hat{\lambda}_{qdr}^{S}*$ instead of the stator flux command value $\lambda_s*$. Since the rotor flux command value $\hat{\lambda}_{qdr}^{S}*$ can be calculated from of the stator flux command value $\lambda_s*$, only the stator flux command value $\lambda_s*$ is illustrated in FIG. 19.

The speed and phase estimation module 121 inputs the stator power supply phase estimated value $\hat{\theta}_e$ as a reference signal to the third coordinate conversion module 17a and the fifth coordinate conversion module 15a.

On the basis of the reference signal, the third coordinate conversion module 17a converts the input signal to a signal of the rotating coordinate system of γ and δ components orthogonal to each other.

By appropriately selecting the phase of the reference signal, it is possible to make the γ component in-phase with the reference and to make the 8 component orthogonal to the reference.

The third coordinate conversion module 17a performs a coordinate conversion to obtain a γ-axis stator current $i_γ$ and a δ-axis stator current $i_δ$, and outputs the current values to the DFOC calculation module 314.

Conversely to the above, the fifth coordinate conversion module 15a converts the voltage command value $V_γ*$ of the γ component and the voltage command value $V_δ*$ of the δ component, which are outputs from the DFOC calculation module 314, to the three-phase stator voltage command values $V_{us}*$, $V_{vs}*$, and $V_{ws}*$. The output from the fifth coordinate conversion module 15a is inputted to the PWM control module 16 and the fourth coordinate conversion module 17b.

The fourth coordinate conversion module 17b converts the inputted three-phase stator voltage command values $V_{us}*$, $V_{vs}*$, and $V_{ws}*$ which are values in fixed coordinate system to the voltage command value $V_{qds}^{S}*$ of two-axes components of dqs-axes. The converted values by the fourth coordinate conversion module 17b are inputted to the current and flux estimation module 20.

The stator flux estimated value $\hat{\lambda}_{qds}^{s}$ and the rotor flux estimated value $\hat{\lambda}_{qdr}^{s}$ estimated by the current and flux estimation module 20 are inputted to the DFOC calculation module 314.

The DFOC calculation module 314 internally generates a stator current command value of they component and a stator current command value of the δ component based on the inputted values, and generates the voltage command value $V_γ*$ of the γ component and the voltage command value $V_δ*$ of they component so that the γ-axis stator current $i_γ$ and the δ-axis stator current $i_δ$ follow the command values.

The voltage command value $V_γ*$ of the γ component and the voltage command value $V_δ*$ are inputted to the fifth coordinate conversion module 15a.

The voltage command value $V_γ*$ of they component and the voltage command value $V_δ*$ re transmitted to the inverter 8 as gate pulses via the PWM control module 16.

Since the torque command limit module 13 and the like are omitted, the advantage of "operation at high power in a wider frequency range", which is achieved in the first embodiment, is restricted in the modification of the third embodiment as compared with the first embodiment.

However, similarly to the second embodiment, the speed and phase estimation module 21 is provided and an input value to the speed and phase estimation module 21 is the rotor dqs-axes flux estimated value $\hat{\lambda}_{qdr}^{S}$ in the third embodiment. Thus, the effects of "improvement of calculation accuracy of the estimated speed value and sensor-less field weakening region increase by the use of the rotor flux", which are the same as those of the second embodiment, can be obtained in the third embodiment.

It should be noted that, although the DB-DFTC calculation module 14 is replaced with the DFOC calculation module 314 in the modification in FIG. 19, the DB-DFTC calculation module 14 may be replaced with a FOC calculation module or an IFOC calculation module.

The controller 11 according to the third embodiment can be achieved by using the structure illustrated in the hardware configuration diagram in FIG. 20.

The features and advantages of the present disclosure (or embodiments) may be summarized as follows.

In the first controller for a power convertor according to the first aspect of the present disclosure, the upper limit torque value is calculated to be smaller as the fundamental wave output frequency of output from the power convertor increases in a field weakening region. In other words, the torque limiter range is set to be smaller as the fundamental wave output frequency increases. The range of the torque command value for maintaining control stability tends to be smaller in a faster operation region in which the fundamental wave output frequency is larger. The torque limiter range is dynamically adjusted in accordance with this tendency. The torque command value changes only in the adjusted torque limiter range, and thus torque increase can be achieved without losing the control stability. As a result, the control stability and the output torque increase can be simultaneously achieved.

According to the second controller for a power convertor according to the second aspect of the present disclosure, the estimated value of the rotor flux is used in calculation. The estimated value of the rotor flux includes less noise than the estimated value of the stator flux, and thus the estimated speed value can be highly accurately calculated with less ripple. The torque command value has less ripple.

According to the third aspect of the present disclosure, the motor driving system including the first controller for a power convertor according to the first aspect can simultaneously achieve the control stability and the output torque increase when the motor is operated fast in the field weakening region. The motor driving system including the second controller for a power convertor according to the second aspect can highly accurately calculate the estimated speed value.

The invention claimed is:

1. A controller for a power convertor, the controller comprising:
    a torque command value calculation module configured to calculate a first torque command value to a power convertor based on a speed command value of a motor driven by the power convertor;

a torque command limit module configured to receive the first torque command value and generate a second torque command value obtained by correcting the first torque command value so that the first torque command value is limited to a torque limiter range defined by an upper limit torque value calculated by a predetermined calculation formula for upper limit torque command value calculation and a lower limit torque value obtained by multiplying the upper limit torque value by a predetermined negative coefficient or zero;

a flux command generation module configured to generate a stator flux command value in accordance with a fundamental wave output frequency of output from the power convertor; and an output voltage command module configured to:
calculate an output voltage command value of the power convertor based on the second torque command value and the stator flux command value;
generate a pulse width modulation signal based on the output voltage command value; and
transmit the pulse width modulation signal,
wherein the torque command limit module calculates the upper limit torque value to be smaller as the fundamental wave output frequency increases at least in a speed region equal to or higher than a field weakening starting point.

2. The controller for a power convertor according to claim 1, wherein
the torque command limit module includes a first block configured to calculate the upper limit torque value in accordance with a predetermined first calculation formula for upper limit torque command value calculation when the fundamental wave output frequency belongs to a first speed region between the field weakening starting point and a boundary speed predetermined to be higher than the field weakening starting point, and
the first calculation formula is a second-order polynomial including a second-order term and a first-order term of the stator flux command value.

3. The controller for a power convertor according to claim 2, wherein the first block determines the torque limiter range in a normal speed region lower than the field weakening starting point.

4. The controller for a power convertor according to claim 2, wherein
the torque command limit module includes a second block configured to calculate the upper limit torque value in accordance with a predetermined second calculation formula for upper limit torque command value calculation when the fundamental wave output frequency belongs to a second speed region equal to or higher than the boundary speed predetermined to be higher than the field weakening starting point, and
the second calculation formula is a monomial obtained by multiplying the second-order term of the stator flux command value by a predetermined coefficient.

5. The controller for a power convertor according to claim 1, wherein the flux command generation module limits the magnitude of the stator flux command value to be equal to or smaller than a predetermined upper limiter flux value.

6. A motor driving system comprising:
a power convertor configured to drive a motor; and
the controller according to claim 1 configured to control the power convertor.

7. A controller for a power convertor, the controller comprising:

a torque command value calculation module configured to calculate a torque command value to a power convertor based on a speed command value of a motor driven by the power convertor;

a voltage command value calculation module configured to calculate a voltage command value to the power convertor based on the torque command value calculated by the torque command value calculation module;

a flux estimation module configured to calculate estimated values of the stator flux and rotor flux of the motor in a subsequent control period based on the voltage command value to the power convertor and a measured stator current of the motor;

a motor speed estimation module configured to calculate an estimated value of a speed of the motor in a subsequent control period based on the estimated value of the rotor flux calculated by the flux estimation module; and an inverter controller configured to:
generate a pulse width modulation signal based on at least one of the torque command value, the voltage command value, the estimated values of the stator flux, or the speed of the motor in a subsequent control period; and
transmit the pulse width modulation signal.

8. The controller for a power convertor according to claim 7, further comprising a switching module provided between the flux estimation module and the motor speed estimation module and configured to selectively transmit one of the estimated values of the stator flux and rotor flux of the motor to the motor speed estimation module.

9. A motor driving system comprising:
a power convertor configured to drive a motor; and
the controller according to claim 7 configured to control the power convertor.

10. The controller for a power convertor according to claim 1, wherein:
a first field weakening region and a second field weakening region are set;
the upper limit torque value is calculated according to a first calculation formula in the first field weakening region, and
the upper limit limiter torque value is further calculated according to a second calculation formula, different from the first calculation formula, in the second field weakening region.

11. The controller for a power convertor according to claim 1, wherein:
a first arithmetic expression calculates the upper limit torque value based on both a current limit and a voltage limit of the power converter, and
a second arithmetic expression calculates the upper limit torque value based on only the voltage limit.

12. The controller for a power convertor according to claim 11, wherein:
the first arithmetic expression differs from the second arithmetic expression based on the difference between a first torque command value and a second torque command value;

the first torque command value is defined as $$\frac{3}{2}\frac{P}{2}\frac{L_m^2}{\sigma L_s^2 L_r}\lambda_{qs\_opt}^e\lambda_{ds\_opt}^e =$$
$$\frac{3}{2}\frac{P}{2}\frac{L_m^2}{(1-\sigma^2)L_s^2 L_r}\sqrt{(L_s^2 I_{smax}^2 - \lambda_{s\_opt}^2)(\lambda_{s\_opt}^2 - \sigma^2 L_s^2 I_{smax}^2)};$$

and the second torque command value is defined as $$\frac{3}{4}\frac{P}{2}\frac{L_m^2}{\sigma L_s^2 L_r}\lambda_{s\_opt}^2.$$

13. The controller for a power convertor according to claim 10, wherein:
the first field weakening region and the second field weakening region are set so that in a graph having $\lambda^{eds}$ and $\lambda^{eqs}$ as axes, the intersection point between an ellipse, representing an inverter current, and a circle, representing and inverter voltage, is the second field weakening region in a region existing below the line of $\lambda^{eds}$ and $\lambda^{eqs}$.

* * * * *

UNITED STATES PATENT AND TRADEMARK OFFICE
CERTIFICATE OF CORRECTION

PATENT NO. : 10,763,769 B2
APPLICATION NO. : 16/022779
DATED : September 1, 2020
INVENTOR(S) : Yang Xu et al.

Page 1 of 1

It is certified that error appears in the above-identified patent and that said Letters Patent is hereby corrected as shown below:

In the Claims

Claim 10, Column 32, Line 49, change "upper limit limiter torque value" to --upper limit torque value--.

Claim 11, Column 32, Line 58, change "power converter," to --power convertor,--.

Claim 13, Column 33, Line 23, change "and inverter voltage," to --an inverter voltage,--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*